(12) United States Patent
Zhang et al.

(10) Patent No.: US 12,236,640 B2
(45) Date of Patent: Feb. 25, 2025

(54) MACHINE LEARNING BASED IMAGE CALIBRATION USING DENSE FIELDS

(71) Applicant: ADOBE INC., San Jose, CA (US)

(72) Inventors: Jianming Zhang, Campbell, CA (US); Linyi Jin, Ann Arbor, MI (US); Kevin Matzen, San Jose, CA (US); Oliver Wang, Seattle, WA (US); Yannick Hold-Geoffroy, San Jose, CA (US)

(73) Assignee: Adobe Inc., San Jose, CA (US)

( * ) Notice: Subject to any disclaimer, the term of this patent is extended or adjusted under 35 U.S.C. 154(b) by 535 days.

(21) Appl. No.: 17/656,796

(22) Filed: Mar. 28, 2022

(65) Prior Publication Data
US 2023/0306637 A1    Sep. 28, 2023

(51) Int. Cl.
| | | |
|---|---|---|
| G06T 7/00 | (2017.01) | |
| G06N 3/045 | (2023.01) | |
| G06T 7/80 | (2017.01) | |
| G06T 9/00 | (2006.01) | |
| G06T 11/00 | (2006.01) | |
| G06V 10/764 | (2022.01) | |

(52) U.S. Cl.
CPC .............. *G06T 7/80* (2017.01); *G06N 3/045* (2023.01); *G06T 9/002* (2013.01); *G06T 11/00* (2013.01); *G06T 2207/20081* (2013.01); *G06T 2207/20084* (2013.01); *G06V 10/764* (2022.01)

(58) Field of Classification Search
CPC . G06T 7/80; G06T 9/002; G06T 11/00; G06T 2207/20081; G06T 2207/20084; G06N 3/045; G06N 3/0455; G06N 3/09; G06V 10/764; G06V 10/245; G06V 10/454; G06V 10/82
See application file for complete search history.

(56) References Cited

PUBLICATIONS

Hold-Geoffroy et al., A perceptual measure for deep single image camera calibration, CVPR (Year: 2018).*
Lee et al., Ctrl-c: Camera calibration transformer with line-classification, ICCV (Year: 2021).*
Lee et al., Automatic upright adjustment of photographs with robust camera calibration, IEEE TPAMI (Year: 2014).*

(Continued)

*Primary Examiner* — Ping Y Hsieh
*Assistant Examiner* — Xiao Liu
(74) *Attorney, Agent, or Firm* — Shook, Hardy & Bacon L.L.P.

(57) ABSTRACT

Systems and methods for image dense field based view calibration are provided. In one embodiment, an input image is applied to a dense field machine learning model that generates a vertical vector dense field (VVF) and a latitude dense field (LDF) from the input image. The VVF comprises a vertical vector of a projected vanishing point direction for each of the pixels of the input image. The latitude dense field (LDF) comprises a projected latitude value for the pixels of the input image. A dense field map for the input image comprising the VVF and the LDF can be directly or indirectly used for a variety of image processing manipulations. The VVF and LDF can be optionally used to derive traditional camera calibration parameters from uncontrolled images that have undergone undocumented or unknown manipulations.

20 Claims, 13 Drawing Sheets

(56) References Cited

PUBLICATIONS

Bogdan et al, Deepcalib: A deep learning approach for automatic intrinsic calibration of wide field-of-view cameras, CVMP (Year: 2018).*

Ahmadyan, A., Zhang, L., Ablavatski, A., Wei ,J., Grundmann, M., "Objectron: A large scale dataset of object-centric videos in the wild with pose annotations," CVPR, 2021, <https://arxiv.org/abs/2012.09988>, 10 pages.

Antunes, M., Barreto, J.P., Aquada, D., Ottersten, B., "Unsupervised vanishing point detection and camera calibration from a single manhattan image with radial distortion," CVPR, 2017, <https://www.researchgate.net/publication/317253117_Unsupervised_Vanishing_Point_Detection_and_Camera_Calibration_from_a_Single_Manhattan_Image_with_Radial_Distortion>, 9 pages.

Armeni, I., Sax, S., Zamir, A.R., Savarese, S., "Joint 2d-3d-semantic data for indoor scene understanding," 2017, <https://arxiv.org/abs/1702.01105>, 9 pages.

Azadi, S., Pathak, D., Ebrahimi, S., Darrell, T., "Compositional gan: Learning image-conditional binary composition," International Journal of Computer Vision, 128(10), 2020, <https://arxiv.org/abs/1807.07560>, 15 pages.

Bansal, A., Russell, B., Gupta, A., "Marr Revisited: 2D-3D model alignment via surface normal prediction," CVPR, 2016, <https://arxiv.org/abs/1604.01347>, 11 pages.

Beardsley, P., Murray, D., "Camera calibration using vanishing points," BMVC, 1992, <https://www.researchgate.net/publication/239405791_A_new_camera_calibration_method_from_vanishing_points_in_a_vision_system>, 10 pages.

Chen, Q., Wu, H., Wada, T. "Camera calibration with two arbitrary coplanar circles," ECCV, 2004, <https://www.researchgate.net/publication/221304888_Camera_Calibration_with_Two_Arbitrary_Coplanar_Circles>, 13 pages.

Esser, P., Rombach, R., Ommer, B., "Taming transformers for high-resolution imagesynthesis," Proceedings of the IEEE/CVF Conference on Computer Vision and Pattern Recognition, 2021, <https://openaccess.thecvf.com/content/CVPR2021/html/Esser_Taming_Transformers_for_High-Resolution_Image_Synthesis_CVPR_2021_paper.html>, 11 pages.

Furukawa, Y. et al., "Accurate camera calibration from multi-view stereo and bundle adjustment," IJCV, 2009, <https://www.di.ens.fr/willow/pdfs/cvpr08a.pdf>, 12 pages.

Heikkila, J. et al., "A four-step camera calibration procedure with implicit image correction," CVPR, 1997, <http://citeseerx.ist.psu.edu/viewdoc/download?doi=10.1.1.94.7536&rep=rep1&type=pdf>, 7 pages.

Hold-Geoffroy, Y. et al., "A perceptual measure for deep single image camera calibration," CVPR, 2018, <https://arxiv.org/abs/1712.01259?context=cs>, 10 pages.

Huang, J. et al., "Framenet: Learning local canonical frames of 3d surfaces from a single rgb image," Proceedings of the IEEE/CVF International Conference on Computer Vision, 2019, <https://arxiv.org/abs/1903.12305>, 13 pages.

Karsch, K. et al., "Automatic scene inference for 3d object compositing," ACM Transactions on Graphics, 2014, <https://arxiv.org/abs/1912.12297>, 14 pages.

Kirillov, A. et al., "PointRend: Image segmentation as rendering," 2019, <https://arxiv.org/abs/1912.08193>, 10 pages.

Lalonde, J.F. et al., "Photo clip art," ACM transactions on graphics, 2007.

Lee, D. et al., "Context-aware synthesis and placement of object instances," Advances in neural information processing systems 31, 2018, <https://papers.nips.cc/paper/2018/hash/c6969ae30d99f73951cb976b88a457af-Abstract.html>, 11 pages.

Lee, H., et al., "Automatic upright adjustment of photographs with robust camera calibration," TPAMI, 2014, <https://citeseerx.ist.psu.edu/viewdoc/download?doi=10.1.1.722.5040&rep=rep1&type=pdf>, 13 pages.

Lee, J. et al., "Ctrl-c: Camera calibration transformer with line-classification," ICCV, 2021, <https://arxiv.org/abs/2109.02259>, 14 pages.

Lee, J. et al., "Neural geometric parser for single image camera calibration," ECCV, 2020, <https://arxiv.org/abs/2007.11855>, 25 pages.

Li, X. et al., "Blind geometric distortion correction on images through deep learning," CVPR, 2019, <https://arxiv.org/abs/1909.03459>, 10 pages.

Lin, C.H. et al., "St-gan: Spatial transformer generative adversarial networks for image compositing," IEEE Conference on Computer Vision and Pattern Recognition (CVPR), 2018, <https://arxiv.org/abs/1803.01837>, 13 pages.

Lin, T.Y. et al., "Microsoft coco: Common objects in context," ECCV, 2014, <https://arxiv.org/abs/1405.0312>, 15 pages.

Lopez, M. et al., "Deep single image camera calibration with radial distortion," CVPR, 2019, <https://openaccess.thecvf.com/content_CVPR_2019/papers/Lopez_Deep_Single_Image_Camera_Calibration_With_Radial_Distortion_CVPR_2019_paper.pdf>, 9 pages.

Mei, C. et al., "Single view point omnidirectional camera calibration from planar grids," ICRA, 2007, <https://www.robots.ox.ac.uk/~cmei/articles/single_viewpoint_calib_mei_07.pdf>, 6 pages.

Melo, R. et al., "Unsupervised intrinsic calibration from a single frame using a 'plumb-line' approach," ICCV, 2013, <https://home.deec.uc.pt/~jpbar/Publication_Source/meloICCV2013.pdf>, 8 pages.

Park, T. et al., "Semantic image synthesis with spatially-adaptive normalization," Proceedings of the IEEE/CVF conference on computer vision and pattern recognition, 2019, <https://arxiv.org/abs/1903.07291?source=post_page#:~:text=We%20propose%20spatially%2Dadaptive%20normalization,%2C%20normalization%2C%20and%20nonlinearity%20layers.>, 19 pages.

Rother, Carsten, "A new approach to vanishing point detection in architectural environments," BMVC, 2002, <http://www.bmva.org/bmvc/2000/papers/p39.pdf>, 10 pages.

Strecha, C. et al., "On benchmarking camera calibration and multi-view stereo for high resolution imagery," In: CVPR, 2008, <http://citeseerx.ist.psu.edu/viewdoc/download?doi=10.1.1.329.6115&rep=rep1&type=pdf>.

Sturm, P.F. et al., "On plane-based camera calibration: A general algorithm, singularities, applications," In: CVPR, 1999, <https://hal.inria.fr/inria-00525681/document>, 8 pages.

Wang, R., et al.,"VPLNet: Deep single view normal estimation with vanishing points and lines," In: CVPR, 2020, <http://szeliski.org/papers/Wang_VPLNet_CVPR20.pdf>, 10 pages.

Wang, W. et al., "TartanAir: A dataset to push the limits of visual slam," 2020, <https://arxiv.org/abs/2003.14338>, 8 pages.

Wang, Y. et al., "Repopulating street scenes," In: Proceedings of the IEEE/CVF Conference on Computer Vision and Pattern Recognition, pp. 5110-5119, 2021, <https://arxiv.org/abs/2103.16183>, 10 pages.

Workman, S. et al., "Deepfocal: A method for direct focal length estimation," In: ICIP, 2015, <http://cs.uky.edu/~scott/resources/deepfocal.pdf>, 5 pages.

Workman, S. et al., "Horizon lines in the wild," BMVC, 2016, <https://a?rxiv.org/abs/1604.02129>, 12 pages.

Xian, W. et al., "Uprightnet: geometry-aware camera orientation estimation from single images," In: ICCV, 2019, <https://arxiv.org/abs/1908.07070>, 10 pages.

Xie, E. et al., "SegFormer: simple and efficient design for semantic segmentation with transformers," In: NeurIPS, 2021, <https://arxiv.org/abs/2105.15203>, 18 pages.

Zhai. M. et al., "Detecting vanishing points using global image context in a non-manhattan world," In: CVPR, 2016, <https://arxiv.org/abs/1608.05684>, 9 pages.

Zhang, L. et al., "Learning object placement by inpainting for compositional data augmentation," In: European Conference on Computer Vision, 2020, <https://www.ecva.net/papers/eccv_2020/papers_ECCV/papers/123580562.pdf>, 16 pages.

Zhang, Z. et al., "A flexible new technique for camera calibration," TPAMI, 2000, https://www.microsoft.com/en-us/research/wp-content/uploads/2016/02/tr98-71.pdf>, 22 pages.

(56) References Cited

PUBLICATIONS

Zhu, R. et al., "Single view metrology in the wild," In: European Conference on Computer Vision, 2020, <https://arxiv.org/abs/2007.09529>, 17 pages.

Roberts, M. et al., "Hypersim: A photorealistic synthetic dataset for holistic indoor scene understanding," In ICCV 2021, 2021, https://arxiv.org/abs/2011.02523>, 11 pages.

Kullback, S. and Leibler, R.A., "On Information and Sufficiency," 1951, <https://projecteuclid.org/journals/annals-of-mathematical-statistics/volume-22/issue-1/On-Information-and-Sufficiency/10.1214/aoms/1177729694.full>, 8 pages.

Luo, X. et al., "Consistent Video Depth Estimation," ACM Transactions on Graphics, vol. 39, No. 4, Article 71, Jul. 2020, <https://arxiv.org/abs/2004.15021>, 13 pages.

"Tilt-shift photography," Wikipedia, accessed Jun. 2022, <https://en.wikipedia.org/wiki/Tilt%E2%80%93shift_photography>, 13 pages.

"The Great Panini Projection," Wikipedia, accessed Jun. 2022, <https://wiki.panotools.org/The_General_Panini_Projection>, 4 pages.

"Box plot," Wikipedia, accessed Jun. 2022, <https://en.wikipedia.org/wiki/Box_plot>, 8 pages.

\* cited by examiner

MACHINE LEARNING BASED IMAGE CALIBRATION USING DENSE FIELDS

BACKGROUND

Image calibration traditionally includes the process of predicting camera parameters given a single image. Camera parameters refer to the camera extrinsic and intrinsic parameters associated with the image capturing device that captured the image. Extrinsic parameters refer to factors that describe the orientation of the image capturing device, such as the rotation and translation (also referred to as roll and tilt). Intrinsic parameters refer to factors that describe the device optics, such as optical center (also known as the principal point), focal length, skew coefficient, and field of view. The camera extrinsic and intrinsic parameters both play a part in how features of a scene as they appear in a world coordinate system are mapped to two-dimensional (2D) pixel coordinates within the captured image frame. The ability to derive the camera parameters associated with a captured image is useful for many photo-editing tasks because those camera parameters at least in part describe how a captured image relates to the real-world scene it represents, and more particularly influence how various elements appear in the captured image with respect to perspective. For example, when the camera parameters for a captured image are known, cropped or extracted regions of that captured image can be adjusted with respect to perspective and/or scale to look realistic when placed into another image that has known camera parameters.

However, for images obtained from uncontrolled sources (such as downloaded from the internet, or received from colleagues, friends or family), the ability to derive the camera parameters can be compromised when those images are the product of editing original images after capture, for example by cropping or performing projective transformations of the original images.

SUMMARY

The present disclosure is directed, in part, to systems and methods for machine learning based image calibration using dense fields, substantially as shown and/or described in connection with at least one of the Figures, and as set forth more completely in the claims.

Embodiments presented in this disclosure provide for, among other things, technical solutions to the problem of estimating traditional camera calibration parameters by introducing a more generalized form of image calibration referred to herein as "view calibration." View calibration comprises the estimation of dense fields that predict how a world spherical coordinate space is projected within the view present in an input image. The projection of the world spherical coordinate space appearing in the input image is represented by two dense fields computed by a dense field machine learning model. These two dense fields are referred to as the vertical vector field (VVF) and the latitude dense field (LDF). The VVF comprises a field of vertical vectors, where each vertical vector represents a projected vanishing point direction as it appears at a pixels of the input image. For example, for a vertical vanishing point, a vertical vector would comprise up-vectors that indicate the direction of the vertical vanishing point as projected onto a given pixel of the input image. The LDF comprise a field of latitude values, where each latitude value represents a projection of a world spherical coordinate space latitude value for each of the pixels of the input image. The VVF and LDF are non-parametric and translation-invariant, and are therefore persistent at the image pixel level even after image cropping or warping processes are applied.

The dense field machine learning model is trained to classify characteristics of an input image into one or more classes or categories to produce a set of view calibration parameters, VVF and LDF, for the input image. In some embodiments, once the view calibration parameters are determine for an input image, they can be directly or indirectly used for a variety of image processing manipulations, such as to produce realistic gravity and/or perspective effects. Embodiments also optionally include using the VVF and LDF to derive traditional camera calibration parameters from uncontrolled images that have undergone undocumented or unknown manipulations. For example, one or more camera calibration parameters for an image can be derived by optimizing for camera parameters that estimate a set of camera parameters that best predicts the VVF and LDF of the view calibration parameters.

BRIEF DESCRIPTION OF THE DRAWINGS

The present disclosure is described in detail below with reference to the attached drawing figures, wherein.

DETAILED DESCRIPTION

Figure 1:
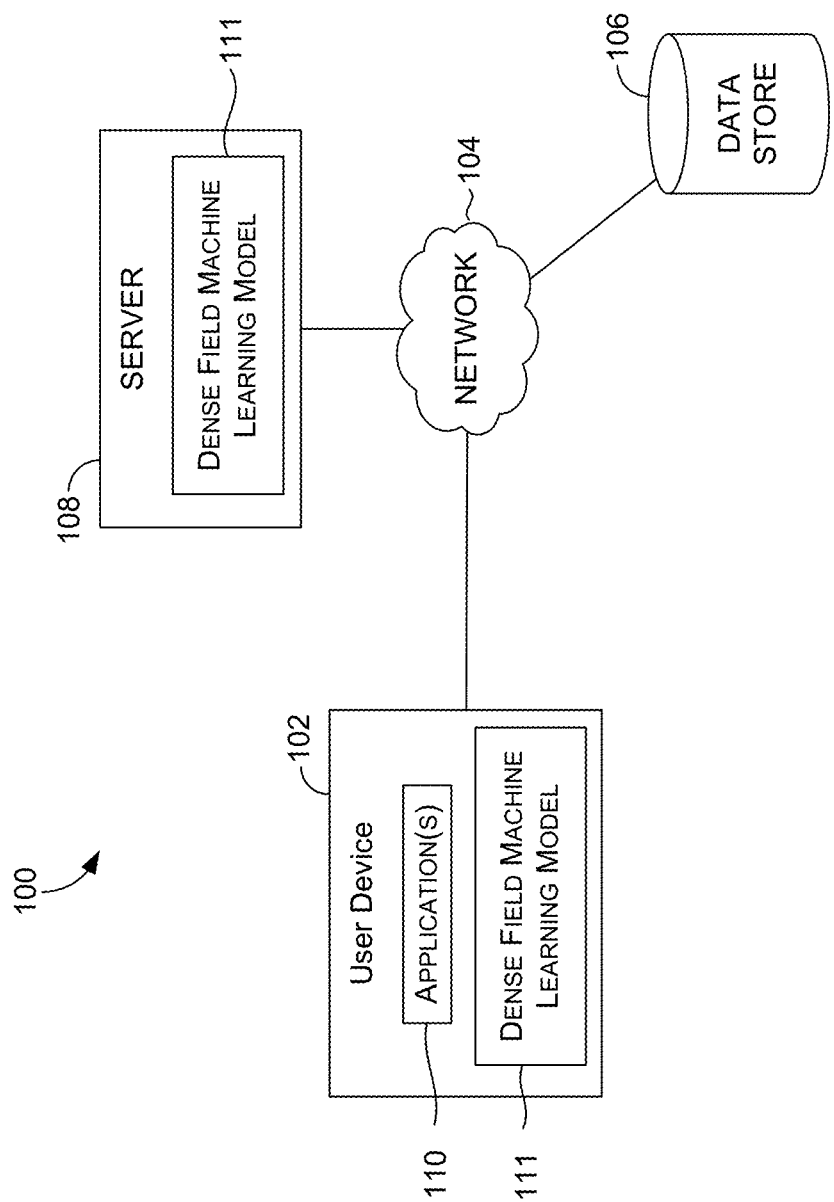
FIG. 1 is a block diagram illustrating an operating environment, in accordance with embodiments of the present disclosure.

In the following detailed description, reference is made to the accompanying drawings that form a part hereof, and in which is shown by way of specific illustrative embodiments in which the embodiments may be practiced. These embodiments are described in sufficient detail to enable those skilled in the art to practice the embodiments, and it is to be understood that other embodiments can be utilized and that logical, mechanical and electrical changes can be made without departing from the scope of the present disclosure. The following detailed description is, therefore, not to be taken in a limiting sense. Rather, the inventors have contemplated that the claimed subject matter might also be embodied in other ways, to include different steps or combinations of steps similar to the ones described in this document, in conjunction with other present or future technologies. Moreover, although the terms "step" and "block" may be used herein to connote different elements of methods employed, the terms should not be interpreted as implying any particular order among or between various steps herein disclosed unless and except when the order of individual steps is explicitly described.

Estimation of camera parameters, also referred to as camera calibration parameters, involves determining extrinsic and/or intrinsic parameters that affect the way a three-dimensional world view scene appears in the pixels of a two-dimensional image captured by a camera sensor. Conventional systems for determining camera parameters rely heavily on scene features, such as lines and vanishing points, and usually make strong assumptions of Manhattan world or Atlanta world, and rigid scene assumptions about orthogonal vanishing points. Such estimation solutions leverage the appearance of edges in the image and apply an upward manmade world assumption where all edges are presumed to be orthogonal, and then based on the appearance of edges, recover camera extrinsic and intrinsic parameters. Other solutions rely on the input of multiple images, captured at different times and/or from different views, to calculate camera parameters based on multi-view geometry.

Other techniques use machine learning to learn properties of images that directly infer camera extrinsic and intrinsic parameters. For example, such techniques may apply a neural network to estimate camera parameters directly as a regression problem, or apply a convolutional neural network (CNN) in a classification manner to directly predict camera parameters, or predict 3D surface geometry and optimize for camera rotation. Techniques also exists that combine learning and geometric analysis by detecting horizontal vanishing points and zenith vanishing points to provide a neural network with geometry cues to improve the camera calibration performance.

However, such methods rely on an assumption that the input image conforms to an image expected from a simplified conceptual camera model (the term "camera model" referring to an underlying conceptual representation of a camera). For example, a "pinhole camera model" is a conceptual representation of a minimal type of camera comprising a light-tight enclosure having a very small "pinhole sized" lens-less opening that serves as the aperture through which light enters the camera. The light entering through the aperture projects an inverted image onto a flat back plate comprising either a photo sensitive plate, firm, or sensor. The optical center of that projected image corresponds in position to the center world coordinate latitude (e.g., the horizon line or zero degrees latitude) of the captured view. Simplified conceptual camera models assume that the principal point of an image is located at the image center. This assumption can be untrue for images from uncontrolled sources. For example, an uncontrolled image can comprise an off-center cropped region of an original image, which means that the principal point is either off-center by an unknown amount in the uncontrolled image, or may not appear in the uncontrolled image at all. When the input image is a version of an original image that was cropped, translated, rotated, and/or otherwise warped, the center the input image may not correspond to the optical center of the original image. Moreover, the center row of pixels of the input image may not correspond to a horizon line of world coordinate space, but can be offset in either the positive or negative direction, and/or rotated with respect to the horizon line. Existing camera parameters estimation techniques do not account for such ambiguities and are therefore limited at their ability to estimate accurate camera parameters for uncontrolled images.

To address these and other problems discussed herein, one or more of the technologies presented in this disclosure provide for, among other things, a new approach for image calibration, which is referred to herein as "view calibration." Instead of evaluating an image to attempt to derive traditional camera parameters, view calibration involves computing dense field representations of the image. These dense field representations can then be used to estimate the traditional camera parameters, or used directly to perform other image processing techniques. The dense field representations can be computed for an uncontrolled image without relying on assumptions that the uncontrolled image conforms to an unedited image from a camera where the simplified conceptual model applies.

Figure 3:
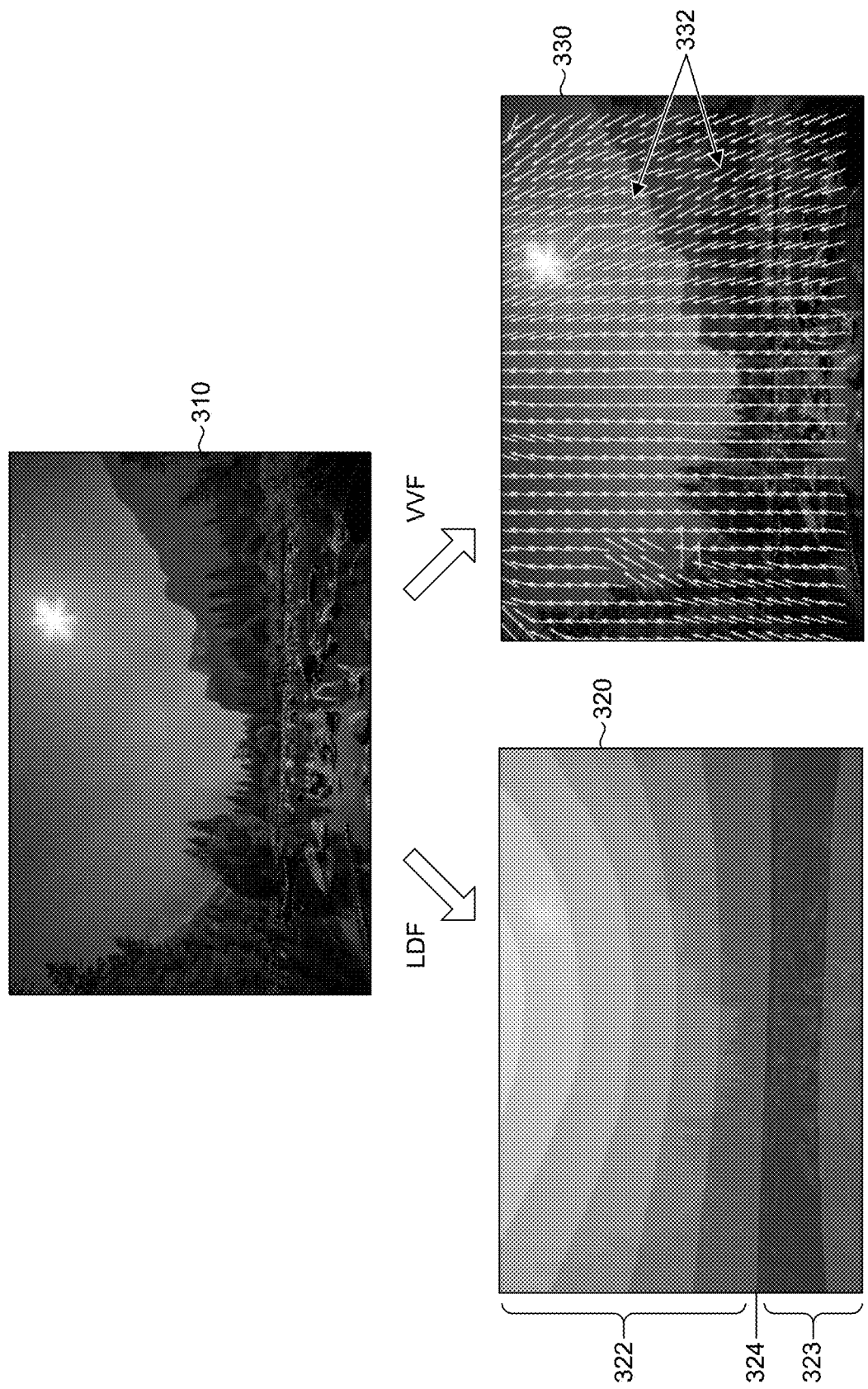
FIG. 3 is a diagram illustrating example vertical vector and latitude dense fields computed for an example input image in accordance with embodiments of the present disclosure.
Figure 4:
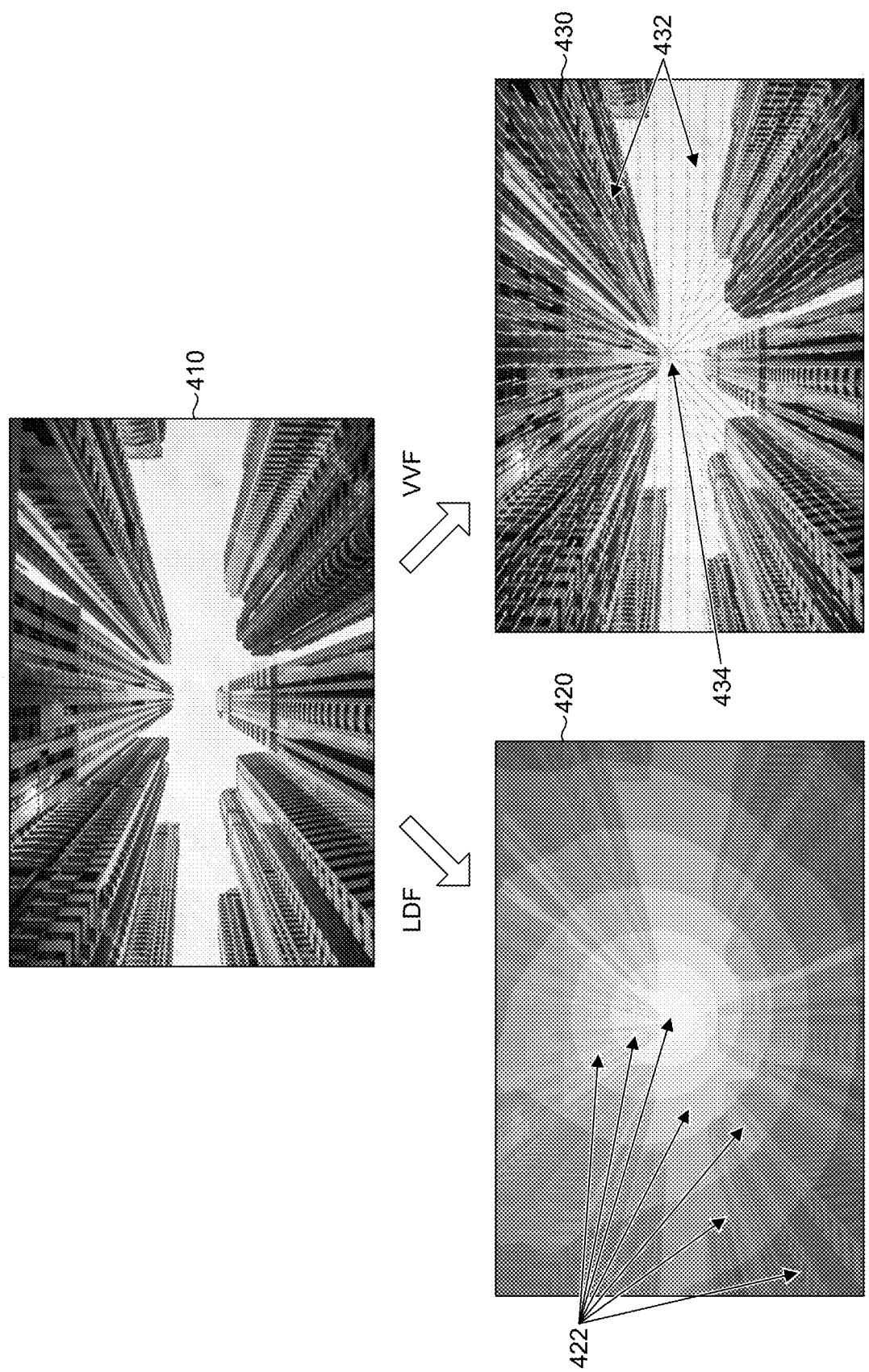
FIG. 4 is a diagram illustrating example vertical vector and latitude dense fields computed for another example input image in accordance with embodiments of the present disclosure.

View calibration, as discussed in greater detail below, comprises the estimation of dense fields that represent an estimate of how a world spherical coordinate space is projected within the view present in an input image. More specifically, view calibration comprises the computation of two dense fields: a vertical vector dense field (VVF) and a latitude dense field (LDF). Each of these two dense fields comprises an array of elements where each element corresponds to a specific pixel of the input image. The elements of the depth fields can also be referred to as pixels of the depth fields. Moreover, the VVF and LDF together define what is referred to herein as "perspective fields" or "view calibration parameters" of the input image. As will be discussed in greater detail below, for each pixel of the input image, the view calibration parameters comprise a "vertical vector" computed as part of the VVF, and a "latitude value" computed as part of the LDF. The VVF and LDF together can be used to form a dense field map of the input image. In the dense field map, each pixel of the input image maps to a specific element of the VVF and a specific element of the LDF. Examples of a VVF and an LFD are illustrated in FIG. 3 and FIG. 4, and are discussed in detail below.

The view calibration parameters, VVF and LDF, represent how a world spherical coordinate space for a real-world scene captured by a camera is projected within the view present in an input image. A distinct advantage of computing the VVF and LDF is that both the VVF and LDF are nonparametric, camera-model agnostic and translation-invariant, meaning that these two dense fields are persistent for each pixel of an image even after application of image cropping and warping processes. As such, view calibration can be applied to various images, including images that have been edited, cropped to re-center the image, warped to change perspective, or captured by specialized non-standard camera setups that introduce warping as an image is captured.

With respect to the VVF, the vertical vector at each element of the VVF each represent a projected vanishing point direction from the input image view. For example, in some embodiments, the projected vanishing point is a vertical vanishing point in the sky. In that case, vertical vectors of the VVF at each pixel would point directly upwards into the sky towards the vertical vanishing point. In some embodiments, a VVF instead comprises vertical vectors that point away from the vertical vanishing point in the sky, for example to represent the direction of the force of gravity. In some embodiments, a VVF comprises vertical vectors that point towards other vanishing points. For example, for an input image looking down into a deep hole, the VVF comprises vertical vectors that point towards a vanishing point at the bottom of the hole. As such, it should be understood that although various examples discussed herein primarily illustrate VVFs comprising "up-vectors" (that is, vectors that point upwards in the direction towards an overhead vertical vanishing point), those are non-limiting examples and that other embodiment include generation of VVFs with vertical vectors that point to other vanishing points.

With respect to the LDF, the latitude value at each element of the LDF represents a projection of a world spherical coordinate system latitude values into the input image. The "world spherical coordinate system" is also known as the "latitude-longitude" or "geographic" spherical coordinate system that is used for a globe, but as applied to captured images, the coordinates are viewed from the perspective of a camera at the center of the globe. For each pixel of an input image, the corresponding element of the LDF is a latitude value that represents an estimate of the respective pixel's distance from (either above or below) the world spherical coordinate system horizon line. A pixel having a latitude value of zero degrees is estimated to fall on the horizon line. For digital photography, the world spherical coordinate system horizon line (zero degrees latitude) would correspond to the center row of pixels of the digital image as captured by the camera. A pixel having a positive latitude value would have a location above the horizon line (with a latitude value of 90 degrees corresponding to pixels capturing a view directly overhead of the camera). A pixel having a negative latitude value would have a location below the horizon line (with a latitude value of −90 degrees corresponding to pixels capturing a view directly below of the camera). The latitude values of the LDF thus represent an angular latitude projected onto each pixel of the input image.

In other words, although view calibration techniques do not assume that an input image conforms to an unedited image from a pinhole camera model, an LDF still utilizes the world spherical coordinate system applicable to the pinhole camera model.

Various terms are used herein to describe various embodiments. Although the terms are described throughout, a brief overview of some of the terms is provided to facilitate an understanding of the present technology.

A camera model generally refers to an underlying conceptual representation of a camera and describes how points in three-dimensional space are projected onto a two-dimensional image plane.

Camera calibration parameters generally refer to extrinsic and intrinsic parameters that affect the transformation between an object in 3D space and the 2D image. Extrinsic parameters refer to factors that describe the orientation of the image capturing device, such as the rotation and translation (also referred to as roll and pitch (or tilt)). Intrinsic parameters refer to factors that describe the device optics, such as optical center (also known as the principal point), focal length, skew coefficient, and field of view.

View calibration parameters refer to dense field representations of perspective information extracted from an input image. View calibration parameters include two components: a vertical vector dense field (VVF) and a latitude dense field (LDF), each of which are discussed in detail herein.

A machine learning model is a type of program that trained to recognize and classify certain types of patterns. A machine learning model can be trained to classify characteristics of an input image into one or more classes or categories, and output statistical information related to the level confidence it has in its classification determinations. With embodiments of this disclosure, a machine learning model is used to compute view calibration parameters from an input image, included both the VVF and LDF.

Turning to FIG. 1, FIG. 1 depicts an example configuration of an operating environment 100 in which some implementations of the present disclosure can be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that can be implemented as discrete or distributed components or in conjunction with other components, and in any suitable combination and location. Various functions described herein as being performed by one or more entities are be carried out by hardware, firmware, and/or software. For instance, in some embodiments, some functions are carried out by a processor executing instructions stored in memory as further described with reference to FIG. 8, or within a cloud computing environment as further described with respect to FIG. 9.

It should be understood that operating environment 100 shown in FIG. 1 is an example of one suitable operating environment. Among other components not shown, operating environment 100 includes a user device, such as user device 102, network 104, a data store 106, and a server(s) 108. Each of the components shown in FIG. 1 can be implemented via any type of computing device, such as one or more of computing device 800 described in connection to FIG. 8, or within a cloud computing environment 900 as further described with respect to FIG. 9, for example. These components communicate with each other via network 104, which can be wired, wireless, or both. Network 104 can include multiple networks, or a network of networks, but is shown in simple form so as not to obscure aspects of the present disclosure. By way of example, network 104 can include one or more wide area networks (WANs), one or more local area networks (LANs), one or more public networks such as the Internet, and/or one or more private networks. Where network 104 includes a wireless telecommunications network, components such as a base station, a communications tower, or even access points (as well as other components) to provide wireless connectivity. Networking environments are commonplace in offices, enterprise-wide computer networks, intranets, and the Internet. Accordingly, network 104 is not described in significant detail.

It should be understood that any number of user devices, servers, and other components are employed within operating environment 100 within the scope of the present disclosure. Each component comprises a single device or multiple devices cooperating in a distributed environment.

User device 102 can be any type of computing device capable of being operated by a user. For example, in some implementations, user device 102 is the type of computing device described in relation to FIG. 8. By way of example and not limitation, a user device is embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The user device 102 can include one or more processors, and one or more computer-readable media. The computer-readable media includes computer-readable instructions executable by the one or more processors. The instructions are embodied by one or more applications, such as application 110 shown in FIG. 1. Application 110 is referred to as a single application for simplicity, but its functionality can be embodied by one or more applications in practice. As indicated above, the other user devices can include one or more applications similar to application 110.

The application 110 can generally be any application capable of facilitating the view calibration techniques described herein, either on its own, or via an exchange of information between the user device 102 and the server 108. In some implementations, the application 110 comprises a web application, which can run in a web browser, and could be hosted at least partially on the server-side of environment 100. In addition, or instead, the application 110 can comprise a dedicated application, such as an application having image processing functionality. In some cases, the application is integrated into the operating system (e.g., as a service). It is therefore contemplated herein that "application" be interpreted broadly.

In accordance with embodiments herein, the application 110 can facilitate implementation of one or more dense field machine learning models to compute view calibration parameters, including a VVF and LDF, for an input image. The input image processed by the application 110 can be obtained from any source. For example, in some embodiments the input image is obtained from a memory of the user device 102, received from a data store 106, or obtained from server 108. In some embodiments, a dense field machine learning model 111 that generates the view calibration parameters is at least in part implemented on the user device 102 and utilized by the application 110 to perform one or more image processing operations using the input image to produce a processed image output. The processed image output can be saved to a memory of the user device 102, and/or transmitted to the data store 106, or to the server 108 for storage or further processing. In some embodiments, the dense field machine learning model 111 that generates the view calibration parameters is at least in part implemented on the server 108. In such an embodiment, the input image can be sent to the server 108 by the application 110 for computation of the view calibration parameters, and the resulting view calibration parameters returned to the application 110.

In operation, a user of the user device 102 can select or input an image or picture for which editing is desired. For instance, a user can select a desired image from a repository, for example, stored in a data store 106 accessible by a network 104 or stored locally at the user device 102. In some embodiments, the input image can be the product of a picture taken by a camera on the user device 102, for which a editing or image correction is desired. The application 110 applies the image to the dense field machine learning model 111, which computes the view calibration parameters for the image. The application 110 can then use the view calibration parameters to apply filters or other image editing to the original image where preserving or manipulating perspective characteristics within the image are desired. In some embodiments, the application 110 can also compute traditional camera calibration parameters from the view calibration parameters in order to apply traditional image editing techniques that rely on the camera calibration parameters.

As described herein, server 108 can facilitate performing computations of view calibration parameters by at least in part implementing the dense field machine learning model 111. Server 108 includes one or more processors, and one or more computer-readable media. The computer-readable media includes computer-readable instructions executable by the one or more processors. The instructions optionally implement one or more components of the image processing environment 200, described in additional detail below with respect to FIG. 2.

For some cloud-based implementations, the instructions on server 108 implement one or more components of image processing environment 200, and application 110 is utilized by a user to interface with the functionality implemented on server(s) 108. In some cases, application 110 comprises a web browser. In other cases, server 108 is not be required. For example, the components of the image processing environment 200, in some embodiments, is implemented completely on a user device, such as user device 102. In this case, the image processing environment 200 is embodied at least partially by the instructions corresponding to application 110. Additionally, other components not shown can also be included within the distributed environment.

Figure 2:
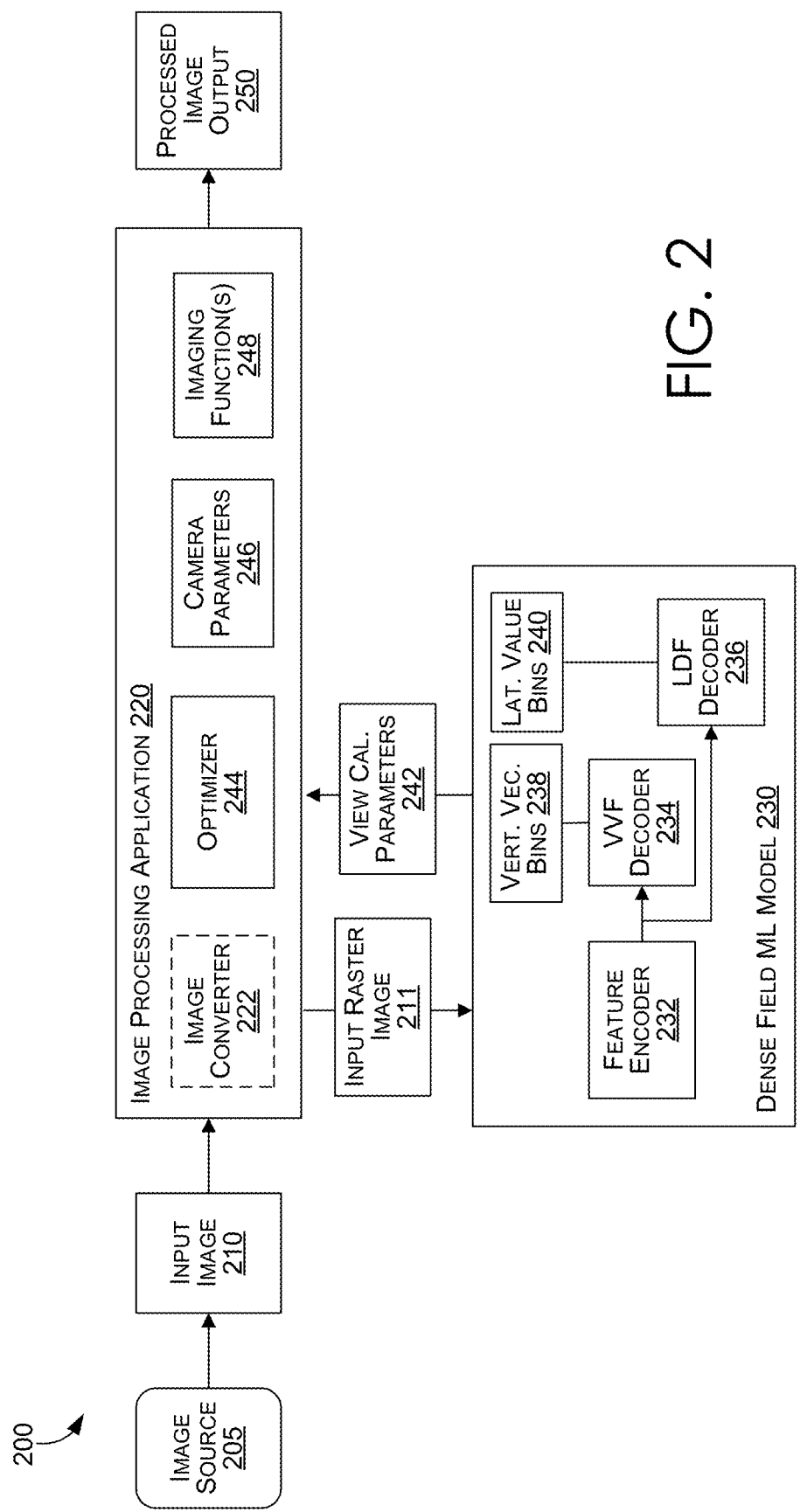
FIG. 2 is a block diagram illustrating an example image processing environment, in accordance with embodiments of the present disclosure.

FIG. 2 is a diagram illustrating an example embodiment of an image processing environment 200 comprising an image processing application 220 (such as one or more of the applications 110 of FIG. 1) and a dense field machine learning model 230 (such as the dense field machine learning model 111 of FIG. 1). Although they are shown as separate elements in FIG. 2, in some embodiments, the image processing application 220 includes the dense field machine learning model 230.

As an example, FIG. 3 illustrates examples of a VVF 330 and a LDF 320 generated by the image processing environment 200 from an input image 310 of a scene comprising a natural landscape. The dense field machine learning model 230 generates the LDF 320, which in this example portrays latitude values for each pixel of the input image 310 as segmented latitude regions 322 and 323. Segmented latitude regions 322 each illustrate a range of positive latitude values and appear above the estimated position of the horizon line (shown at 324). Segmented latitude regions 323 each illustrate a range of negative latitude values and appear below the estimated position of the horizon line 324. The dense field machine learning model 230 also generates the VVF 330, which in this example portrays the vertical vectors of the VVF 330 as a field of arrows 332 each pointing in a direction towards a vertical vanishing point (which in this example, does not appear in the input image 310) as estimated for each pixel of the image 310.

FIG. 4 similarly illustrates examples of a VVF 430 and LDF 420 generated from an input image 410 for a man-made scene comprising a city landscape. The dense field machine learning model 230 generates the LDF 420, which in this example portrays latitude values for each pixel of the input image 410 as segmented latitude regions 422. In this example, each of the segmented latitude regions 422 correspond to positive latitude values that appear above the estimated position of a horizon line. In this case, the dense field machine learning model 230 did not infer any of the pixels of input image 410 as falling below the horizon line. The dense field machine learning model 230 also generates the VVF 430, which in this example portrays the vertical vectors of the VVF 430 as a field of arrows 432 pointing in a direction of a vertical vanishing point 434 as estimated for each pixel of the image 410.

In some embodiments (as more particularly described in FIGS. 8 and 9), the image processing application 220 is implemented by a processor 814 (such as a central processing unit), or controller 910 implementing a processor, that is programed with code to execute one or more of the functions of the image processing application 220 described herein. The image processing application 220 can be a sub-component of another application. The dense field machine learning model 230 can be implemented by a neural network, such as a deep neural network (DNN), executed on an inference engine. In some embodiments, the dense field machine learning model 230 is executed on an inference engine/machine learning coprocessor coupled to controller, such as but not limited to a graphics processing unit (GPU).

In the embodiment shown in FIG. 2, the image processing environment 200, receives an input image 210 (e.g., a digital image) from an image source 205. In this example, the input image 210 is received as input to the image processing application 220. In some embodiments, the input image 210 comprises a digital image raster-based file that includes an image comprised of a plurality of pixels. The image source 205 can be an image capturing device, such as a digital camera, or a data store that comprises previously captured images stored as files. In other embodiments, the image source 205 comprises a streaming video camera or server where the input image 210 is an image frame of a video stream. The pixels of the input image 210 can be encoded using any color space, such as but not limited to Adobe RBG (Red, Green, Blue), standard RGB (sRGB), CMYK (cyan, magenta, yellow, and key), and variants thereof. Example raster-based file types include, but are not limited to, Joint Photographics Expert Group (JPEG) files, Graphics Interchange Format (GIF) files, Portable Network Graphic (PNG) files, Adobe Photoshop Document (PSD) files, Tagged Image File Format (TIFF) files, and RAW image files. In other embodiments, the input image 210 instead comprises a non-raster-based image type, such as but not limited to a vector-based image. Example vector image files include, but are not limited to, Scalable Vector Graphics (SVG) files, Encapsulated PostScript (EPS) files, Adobe Illustrator (AI) files, PostScript (PS), and Enhanced Metafile ((EMF) image files. The image processing application 220 can therefore optionally include an image converter 222 to convert the format of the input image 210 as received from a non-raster-base file type into an input raster image 211 (also referred to as input image 211) that has a raster image format.

In the embodiment of FIG. 2, an input raster image 211 based on the input image 210 is passed by the image processing application 220 in raster format to the dense field machine learning model 230, from which the VVF and LDF are computed for the input image 210. The dense field machine learning model 230 takes the single raster image 211 as an input image. For each pixel of the input raster image 211, the dense field machine learning model 230 computes a vertical vector and a latitude value. The computed vertical vectors form the VVF and the computed latitude vectors form the LDF.

Figure 2A:
FIGS. 2A and 2B are diagrams illustrating vertical vector and latitude dense fields for computing view calibration parameters in accordance with embodiments of the present disclosure.

For purposes of illustration, FIG. 2A illustrates an example input image 260 overlaid by a vertical vector 262 computed by the dense field machine learning model 230 for a pixel x1 at coordinate (x1, y1), and a vertical vector 264 at pixel location x2 at coordinate (x2, y2), with each vertical vector in this example pointing upwards into the sky towards a vertical vanishing point as observed at the respective pixel locations of the input image. The dense field machine learning model 230 essentially implements a projection function, x=P(X), that maps a point in the world spherical coordinate system, X, to a point x on the image plane of the input raster image 211, and computes a vertical vector, u, for each pixel of the input raster image 211 that points towards a vertical vanishing point (VVP). The vertical vanishing point may, or may not, itself appear within the bounds of the input raster image 211. In this example, the vertical vector, u, is an "up vector" pointing towards an overhead vertical vanishing point (VVP). For each pixel location x, of the input raster image 211, the dense field machine learning model 230 is trained to infer from the input image an up vector, u, that is a projection of the tangential direction long the longitude towards the VVP, from the south pole to the north pole of the world view spherical coordinate system. As mentioned previously, the dense field machine learning model 230 can be trained in some embodiments to output other VVFs, for example where the vertical vectors point down away from an overhead VVP, or towards a downward VVP.

Figure 2B:
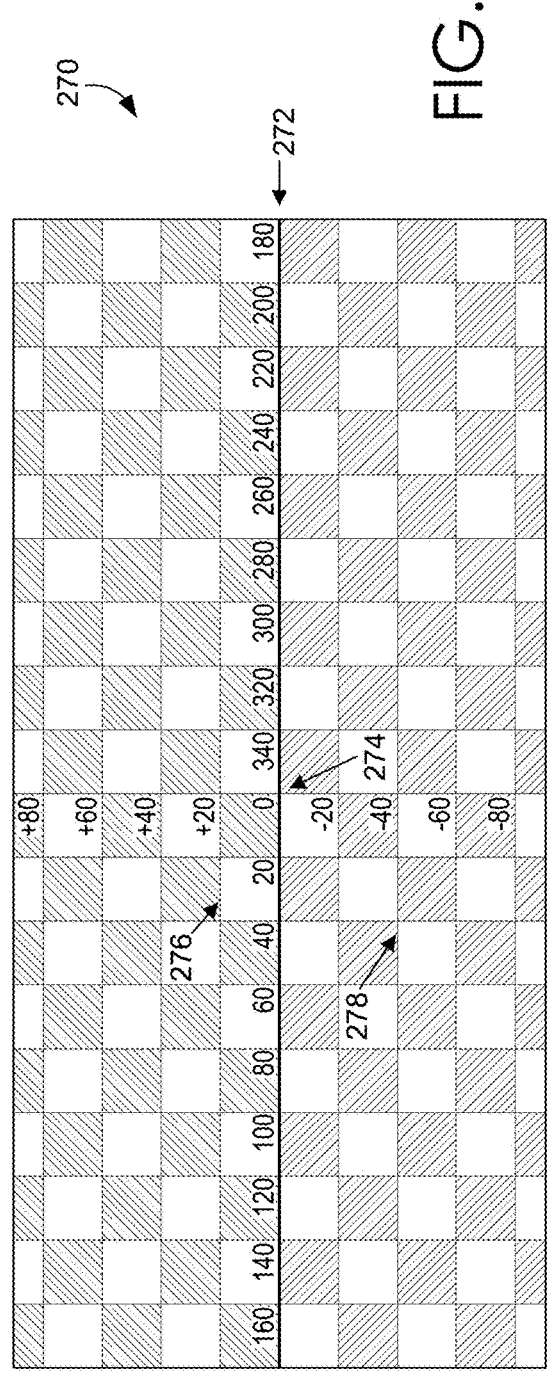

FIG. 2B illustrates the concept of latitude values generated by the dense field machine learning model 230 for producing an LDF. The latitude value, $\varphi$, associated with a pixel location x of the original image is defined as the latitude of point x with respect to the world view spherical coordinate system, and can be represented by a scalar value.

An example world view spherical coordinate system grid 270 is shown in FIG. 2B. The world view "horizon line" 272, is defined as 0 degrees latitude on the grid 270 and runs through the image principal point 274 of an unedited image as captured. The horizon line 272 sets the origin for longitude values, which are measured in units of degrees latitude. For example, a pixel x3 at coordinate (x3, y3), (shown at 276) would have a latitude value of +20 degrees, while a pixel x4 at coordinate (x4, y4), (shown at 278) would have a latitude value of −40 degrees. For each pixel location x, of the input raster image 211, the dense field machine learning model 230 is trained to infer from the input image the latitude value, $\varphi$, associated with a pixel location x of the original image. It should be noted that depending on how an original as-captured image is cropped, the resulting input raster image 211 evaluated by the dense field machine learning model 230 might not actually include a view of the horizon line of the original as-captured image. The latitude values computed by the dense field machine learning model 230 are estimates of latitude values made with respect to that horizon line of the original as-captured image.

Returning to FIG. 2, the dense field machine learning model 230 in this embodiment comprises an encoder-decoder machine learning neural network comprising a feature encoder 232, an VVF decoder 234 and a LDF decoder 236. Although shown as distinct decoders, in some embodiments the functions described herein for the VVF decoder 234 and LDF decoder 236 is performed by a combined decoder. Moreover, it should be understood that the encoder-decoder architecture shown in FIG. 2 for dense field machine learning model 230 is provided as an example machine learning model that can be used to compute the VVF and LDF. However, in other embodiments, the VVF and LDF are generated using other machine learning model architectures.

The dense field machine learning model 230 inputs the input raster image 211 and outputs vertical vectors for each pixel as a confidence vector into vertical vector bins 238, and latitude values as a confidence vector into latitude value bins 240. With an encoder-decoder based model, the encoder received an image as a variable-length sequence and outputs an encoded state based on a known and fixed structure. The decoder maps the encoded state to an output sequence. In this embodiment, the feature encoder 232 received inputs an input raster image 211 and applies, for example, a transformer-based backbone to extract hierarchical features. In some embodiments, a transformer-based backbones such as a Mix Transform encoder (e.g., the variant MiT-b3) from a SegFormer model are used by the feature encoder 232 to extract course and fine hierarchical features. The feature encoder 232 encodes course and fine hierarchical features into a compact form of a feature map, extracting the features layer by layer from the input raster image 211 to derive a set of feature maps of different dimensions and layers.

The dense field machine learning model 230 uses the decoders to estimate the VVF and LDF for input raster image 211. The VVF decoder 234 and LDF decoder 236 each process the compact feature map produced by the feature encoder 232, and for each pixel of the input raster image 211, produce a vertical vector and latitude value. The VVF decoder 234 and LDF decoder 236, in some embodiments, output representations of the vertical vectors and latitude values as probability distributions. For example, in some embodiments, the vertical vector output from the dense field machine learning model 230 is in the form of a first confidence vector, with the elements of the first confidence vector corresponding to a set of classification bins referred to as "vertical vector bins" (shown at 238). Similarly, the latitude value output from the dense field machine learning model 230 is in the form of a second confidence vector, with the elements of the second confidence vector corresponding to a set of classification bins referred to as "latitude value bins" (shown at 240). That is, the dense field machine learning model 230 essentially applies neural network technology to transform the regression problem of computing camera parameters into a classification problem well suited for processing by a neural network.

Figure 2C:
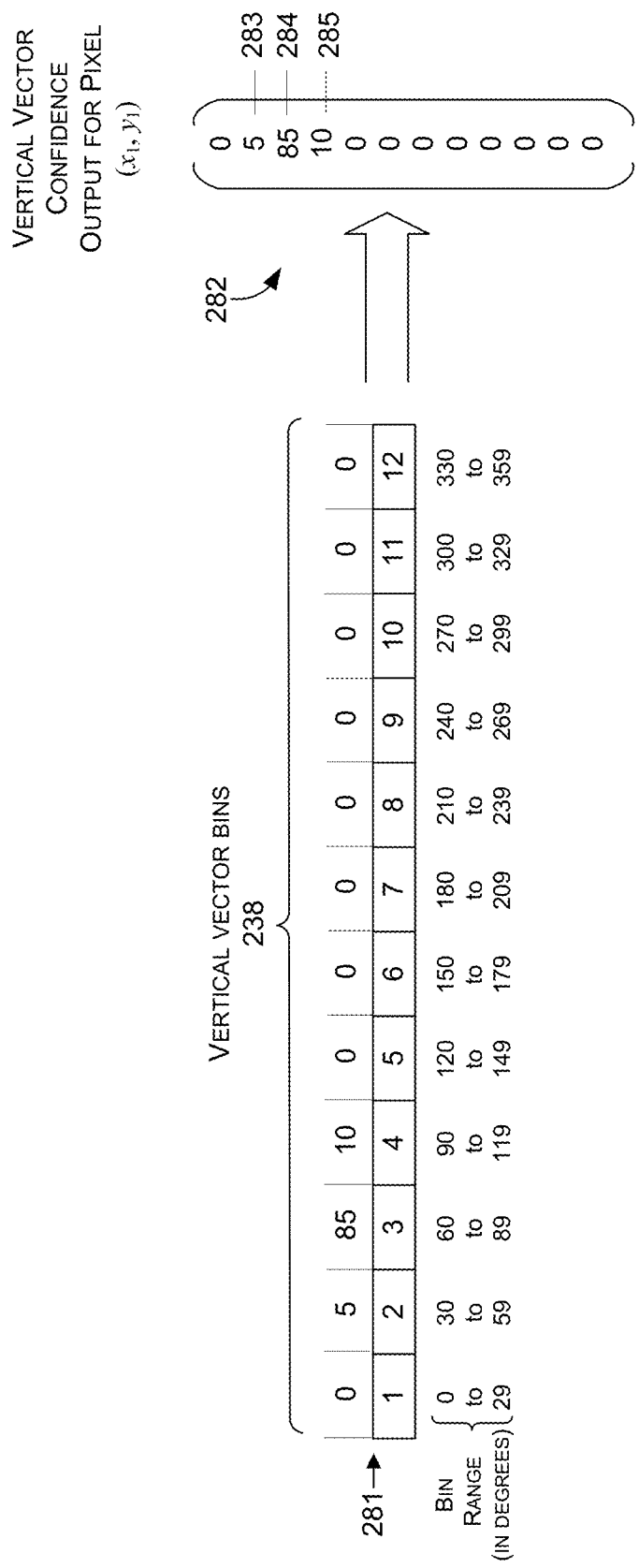
FIG. 2C is a diagram illustrating an example confidence vector and classification bins computed for a vertical vector of a vertical vector dense field.
Figure 2D:
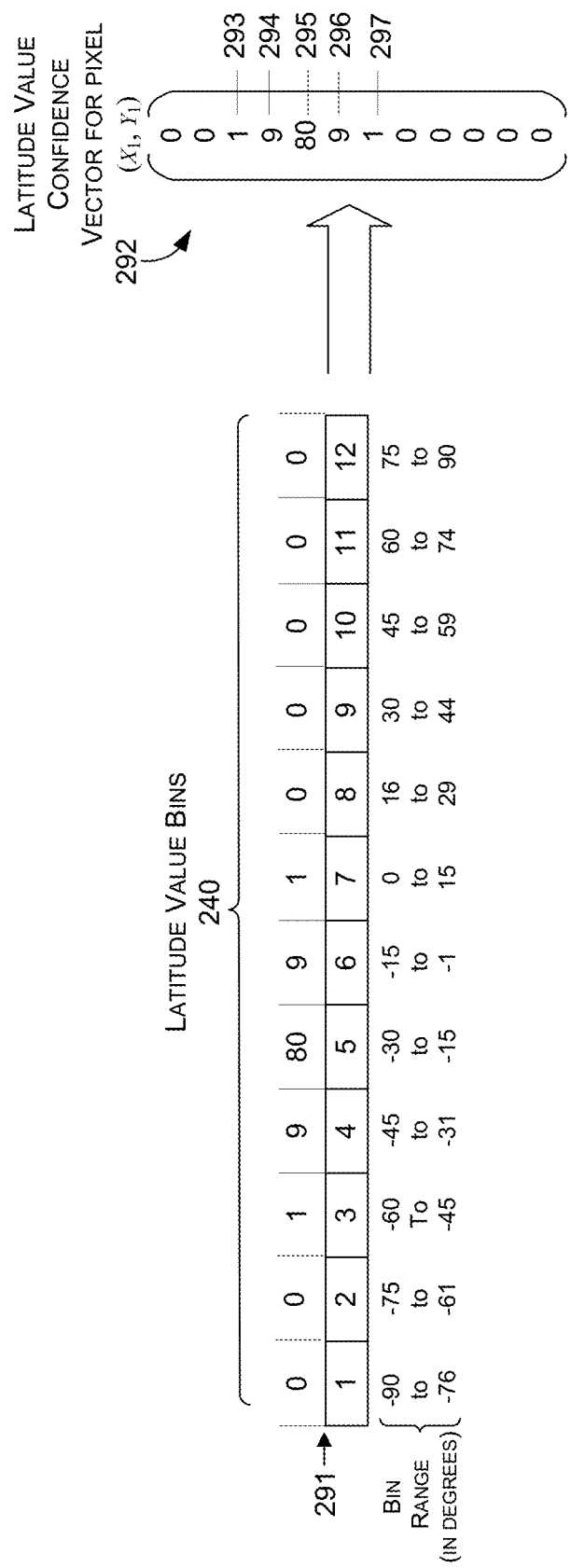
FIG. 2D is a diagram illustrating an example confidence vector and classification bins computed for a latitude value of a latitude dense field.

Illustrative examples of confidence vectors associated with vertical vectors and altitude values, and their corresponding bins, are provided in FIGS. 2C and 2D.

Referring first to FIG. 2C, a set of vertical vector bins 238 is shown containing a probability distribution for a vertical vector computed by the VVF decoder 234 for a given pixel x at coordinate $(x_1,y_1)$ of an input raster image 211. The possible range of angular directions in which the vertical vector can point is from 0 degrees to 360 degrees. Accordingly, vertical vector bins 238 for this range of possible angular directions is divided into a plurality of N discrete bins (shown at 281). For this example in FIG. 2C, the vertical vector bins 238 are illustrated as comprising N=12 discrete bins so that each bin represents a range of 30 degrees/bin (i.e., 360 degrees/12 bins=30 degrees per bin). It should be understood that the use of N=12 bins was selected only for ease of illustration and that the number of bins in various embodiments can be greater or less than 12 based on the desired degree of resolution for a particular application. Probability values computed for each of the bins 281 indicated the confidence level of the VVF decoder 234 that a vertical vector has an angular direction falling within the range of that bin. The elements of the confidence vector 282 that are output from the dense field machine learning model 230 each correspond to a confidence level of one of the N bins 281.

For example, in the example of FIG. 2C, the confidence vector 282 comprises a second element 283 with a value of 5 corresponding to bin 2, a third element 284 with value of 85 corresponding to bin 3, and a fourth element 285 with value of 10 corresponding to bin 4. Bin 2 corresponds to a vertical vector having an angular direction between 30-60 degrees and the probability value of 5 in bin 2 indicates that the dense field machine learning model 230 estimates a 5% probability of the vertical vector having an angular direction between 30-60 degrees. Bin 3 corresponds to a vertical vector having an angular direction between 60-90 degrees and the probability value of 85 in bin 3 indicates that the dense field machine learning model 230 estimates an 85% probability of the vertical vector having an angular direction between 60-90 degrees. Bin 4 corresponds to a vertical vector having an angular direction between 90-120 degrees and the probability value of 10 in bin 4 indicates that the dense field machine learning model 230 estimates a 10% probability of the vertical vector having an angular direction between 90-120 degrees. The remaining elements of vector 282 and bins 281 each indicate a probability value of zero, indicating that the dense field machine learning model 230 estimates a 0% probability of the vertical vector being properly classified as belonging to any of those other bins. In this manner, the dense field machine learning model 230 classifies the angle of the vertical vector for each pixel of the input image in the form of a confidence vector.

In the example of FIG. 2D, a set of latitude value bins 240 is shown containing a probability distribution computed by the LDF decoder 236 for the pixel x at coordinate $(x_1,y_1)$ of input raster image 211. The possible range of latitude values ranges from −90 degrees to +90 degrees. Accordingly, latitude value bins 240 for this range of possible latitude values is divided into a plurality of M discrete bins (shown at 291). For this example in FIG. 2D, the latitude value bins 240 are illustrated as comprising M=12 discrete bins so that each bin represents a range of 15 degrees/bin (i.e., 180 degrees/12 bins=15 degrees/bin). It should be understood that the use of M=12 bins in FIG. 2D was selected only for ease of illustration and that the number of bins in various embodiments is another value greater or less than 12 based on the desired degree of resolution for a particular application. Probability values computed for each of the bins 291 indicated the confidence level of the LDF decoder 236 that a latitude value has a value falling in the range of that bin. The elements of the confidence vector 292 that is output from the dense field machine learning model 230 each correspond to a confidence level of one of the N bins 291.

In the example of FIG. 2D, the confidence vector 292 comprises a third element 293 with a value of 1 corresponding to bin 3, a fourth element 294 with value of 9 corresponding to bin 4, a fifth element 295 with value 80 corresponding to bin 5, a sixth element 296 with value 9 corresponding to bin 6, and a seventh element 297 with value of 1 corresponding to bin 7. Bin 3 corresponds to an latitude value between −60 to −45 degrees and the probability value of 1 in bin 3 indicates that the dense field machine learning model 230 estimates a 1% probability of the latitude value having a value between −60 to −45 degrees. Bin 4 corresponds to a latitude value between −45 to −30 degrees and the probability value of 9 in bind 4 indicates that the dense field machine learning model 230 estimates an 9% probability of the latitude value having a value between −45 to <30 degrees. Bin 5 corresponds to a latitude value between −30 to −15 degrees and the probability value of 80 in bin 5 indicates that the dense field machine learning model 230 estimates an 80% probability of the latitude value having a value between −30 to −15 degrees. Bin 6 corresponds to a latitude value between −15 to 0 degrees and the probability value of 9 in bin 6 indicates that the dense field machine learning model 230 estimates a 9% probability of the latitude value having a value between −15 to 0 degrees. Bin 7 corresponds to a latitude value between 0 to 15 degrees and the probability value of 1 in bind 7 indicates that the dense field machine learning model 230 estimates a 1% probability of the latitude value having a value between 0 to 15 degrees. The remaining elements of vector 282 are zero, indicating that the dense field machine learning model 230 estimates a 0% probability of the latitude value should be classified as belonging to any of those other bins. In this manner, the dense field machine learning model 230 classifies the latitude value by indicating the probability that it can be categorized as belonging to each of the bins.

Referring again to FIG. 2, in one embodiment, the view calibration parameters 242 (comprising the VVF and LDF) are output as a dense field map to the image processing application 220. These view calibration parameters 242 can be either used directly by one or more other imaging functions 248 (such as image editing or presentation functions, for example), or first converted to camera parameters 246 and the camera parameters 246 provided to the one or more other imaging functions 248. The imaging functions 248 can then be applied to the input image 210 to generate a processed image output 250.

In some embodiments, the image processing application 220 comprises an optimizer 244 that takes as input the view calibration parameters 242 to compute the camera parameters 246. More specifically, traditional camera parameters (such as camera roll (r), pitch (p), and field of view (f)) can be estimated by the optimizer 244 by executing an iterative optimization process to find a set of camera parameters that best predicts the VVF and LDF of the view calibration parameters 242. For example, the projection function P(X) is derivable by from the derivable roll, pitch and field of view parameters so that if starting from a known set of roll, pitch and field of view parameters for an image, a vertical vector, u, and latitude value, φ, at any given pixel, x, of that image can be computed. For example, for an embodiments that uses vertical vectors that comprise up-vectors, the vertical vector for a pixel, x, can be expressed from roll, r, pitch, p, and field of view, f, as:

$$u_x = \text{sign}(p) \times (x - (-f \sin(r)/\tan(p), -f \cos(r)/\tan(p)))$$

which calculates the direction from the pixel x at coordinate (x, y) towards the zenith vanishing point and the term sign(p) ensures that the up vector, $u_x$, is pointing up, or in the case where p is zero, the up vector will be perpendicular to the horizon line 272. The latitude value, φ, at any given pixel, x, can also be readily computed based on a function $\varphi_x = \text{lati}(X)$ that obtains the latitude of the unprojected 3D point.

In general, the optimizer 244 starts with a set of proposed camera parameters (roll, r, pitch, p, and field of view, f) and computes an estimated set of VVF and LDF that would be expected from those camera parameters. The set of VVF and LDF estimated by the optimizer 244 is compared to the view calibration parameters 242 set of VVF and LDF from the dense field machine learning model 230 to determine a difference between the sets. The optimizer 224 then varies (i.e., optimizes) the set of proposed camera parameters (roll, r, pitch, p, and field of view, j) to converge on an estimated set of VVF and LDF that most closely matches the view calibration parameters 242 set of VVF and LDF from the dense field machine learning model 230.

More specifically, in some embodiments, the optimizer 244 evaluates two differentiable functions $y_{up} = \text{up}(r, p, f)$ and $y_{lati} = \text{lati}(r, p, f)$ to converge on a set of camera parameters (r, p, f) that best correspond to the VVF and LDF computed by the dense field machine learning model 230. The optimizer 244 optimizes these functions for $y_u$ and $y_{lati}$ to generate a VVF estimate and a LDF estimate that best match the VVF and LDF of the view calibration parameters 242. For example, given a set of y=(r, p, f) camera parameters and predicted view calibration parameters 242 having confidence vectors with distributions $x = f(I^{(i)}; \theta)$ as the target, the optimizer 244 matches y to the predicted vertical vector and latitude value confidence vector distributions for each pixel of the input image. In some embodiments, a soft distribution $\hat{d}$ is obtained from y such that the expected value of $\hat{d}$ equals y. The optimizer 244 then minimizes a Kullback-Leibler (KL) divergence between the predicted view calibration parameters 242 confidence distribution and the soft distribution constructed from the camera parameters estimated by the optimizer 244, which can be expressed as:

$$\mathcal{L}(x, \hat{d}) = \sum_{j=1}^{k} x_j \log \frac{x_j}{\hat{d}_j}$$

which describes agreement between the estimated camera parameters and the predicted dense fields. For each predicted, p, r, and f value, the corresponding VVF and LDF are computed. When the results are in agreement, the KL divergence will be very low. When a computed KL divergence is less than a predetermine threshold, the optimizer 224 outputs p, r, and f as a set of camera parameters 246 that correspond to the view calibration parameters 242 computed by the dense field machine learning model 230.

Figure 5:
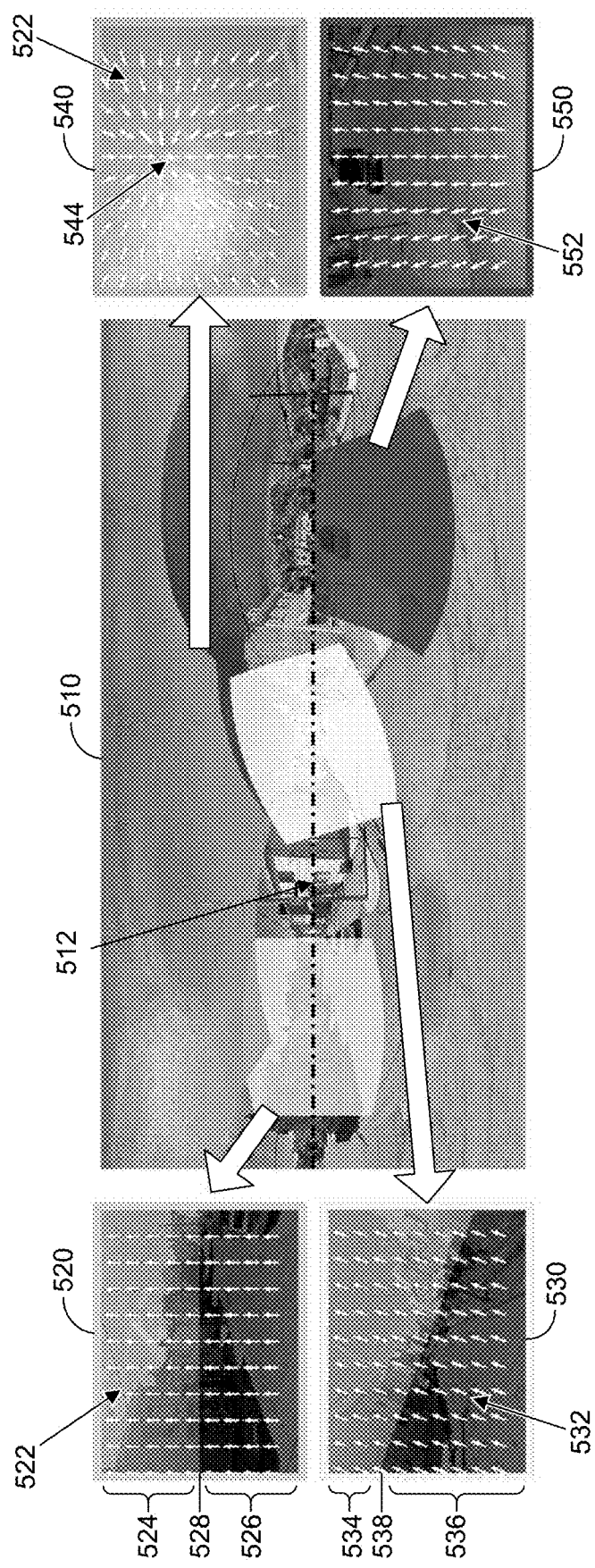
FIG. 5 is a diagram illustrating non-parametric, camera-model agnostic and translation-invariant characteristics of vertical vector and latitude dense fields in accordance with embodiments of the present disclosure.

As previously discussed, one distinct advantage of the view calibration parameters, VVF and LDF, is that both of these dense fields are non-parametric, camera-model agnostic and translation-invariant, meaning they these dense fields are persistent with each pixel even after application of image cropping and warping processes. This characteristic of the view calibration parameters is illustrated by reference to FIG. 5. FIG. 5 depicts a 360 degree panorama image 510 for which selected views 520, 530, 540 and 550 are shown for views cropped from the image 450. In each of the views 520, 530, 540 and 550, the VVF encodes a vertical vector (for this example, a vertical up vector) at each pixel as it appears in that view. In this example, each vertical vector points in a vertical direction towards a vertical vanishing point of the original image 510. The LDF as it is presented in each of the views 520, 530, 540 and 550 for this example indicate whether pixels in that view are above the horizon line 512 of image 510 or below the horizon line 512.

View 520 comprises a crop of image 510 looking straight forward without camera rotation or pitch translation. The vertical vectors 522 of the VVF for the view 520 are essentially parallel and straight up and in alignment. Positive latitude values of the LDF appear in region 524 and negative latitude values appear in region 526. These estimated latitude values of the LDF indicate a center vertical 528 of the view 520 that aligns with horizon line 512 of image 510. View 530 is a crop of image 510 that includes a camera rotation without pitch translation. Here, the vertical vectors 532 of the VVF for the view 530 remain essentially parallel to each other, but encode a rotation with respect to the image 510 due to the way in which view 530 was cropped from image 510. Positive latitude values of the LDF appear in region 534 and negative latitude values of the LDF appear in region 536. The estimated latitude values reveal a rotated center vertical 538 that corresponds to the horizon line 512 of image 510.

View 540 is a crop of image 510 that includes an upward pitch (that is, a cropping of part of image 510 that looks up relative to the horizon line 512) that captures the vertical vanishing point 544. Here, the vertical vectors 542 of the VVF across the view 540 are no longer parallel to each other, but each comprise a vector pointing to the vertical vanishing point 544 as captured in the view 540. Because the view 540 is a crop of image 510 entirely above the horizon line 512, the LDF for view 540 would only comprises positive latitude values.

View 550 is a crop of image 510 that includes a downward pitch (that is, a cropping of part of image 510 looking down relative to horizon line 512). Here, the vertical vectors 552 of the VVF across the view 550 each comprise a vector pointing upward in a direction that corresponds to the upward vertical direction of the original image 510. View 550 comprises an image cropping of the image 510 entirely below the horizon line 512 so that the LDF for view 550, only incudes negative latitude values appear.

For each of the views 520, 530, 540 and 550 representing different cropped regions of the original image 510, the VVFs and LDFs obtainable from those cropped views continue to preserve vertical vectors and latitude values for each pixel that corresponds to the VVF and LDF of the original image 510 from which the respective view was derived.

Figure 6:
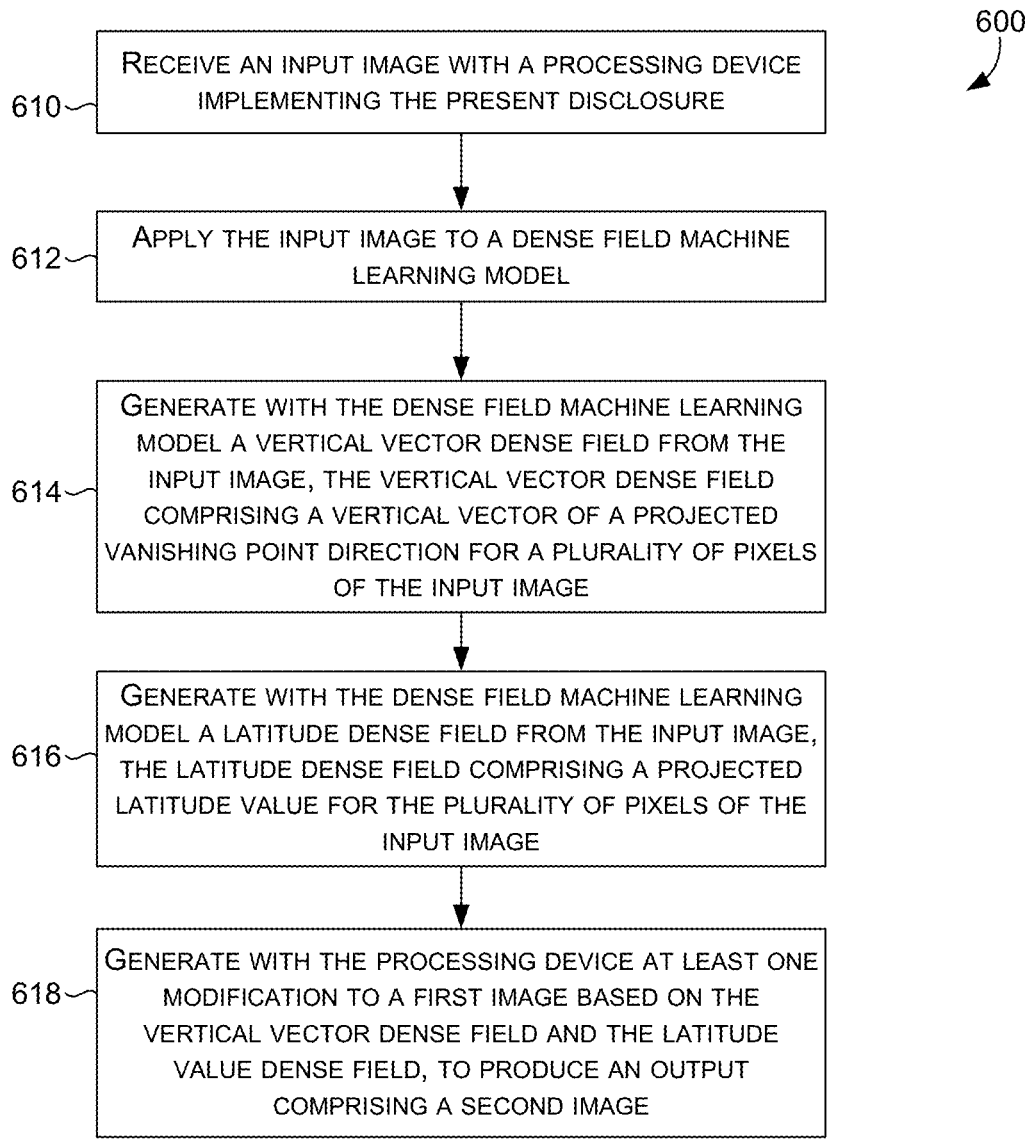
FIG. 6 is a flow chart illustrating an example method embodiment for computing vertical vector and latitude dense fields in accordance with embodiments of the present disclosure.

In order to illustrate an example process implemented by the image processing environment 200, FIG. 6 comprises a flow chart illustrating a method 600 embodiment for computing view calibration parameters. It should be understood that the features and elements described herein with respect to the method 600 of FIG. 6 can be used in conjunction with, in combination with, or substituted for elements of, any of the other embodiments discussed herein and vice versa. Further, it should be understood that the functions, structures, and other descriptions of elements for embodiments described in FIG. 6 can apply to like or similarly named or described elements across any of the figures and/or embodiments described herein and vice versa. In some embodiments, elements of method 600 are implemented utilizing the image processing environment 200 disclosed above, or other processing device implementing the present disclosure.

Method 600 begins at 610 with receiving an input image at a processing device implementing the present disclosure. In some embodiments, the input image is received as input to an image processing application. In some embodiments, the image processing application is executed by a processor, or implemented as a function of a cloud computing environment. If the input image as received is not a digital raster-based image, in some embodiments, it is converted into a digital raster-based input image by the image processing application. In some embodiments, the image source from which the input image is received comprises an image capturing device such as a digital camera, a data store that comprises previously captured images stored as files, a streaming video camera, a smart phone, tablet, workstation, or server, or any other image source. In some embodiments, the input image comprises an image frame of a video stream. At 612, the method 600 includes applying the input image to a dense field machine learning model. In some embodiments, the dense field machine learning model is executed by a processor, or implemented as a function of a cloud computing environment. The dense field machine learning model receives the input image, and outputs a vertical vector and latitude value for the pixels of the input image to generate the respective vertical vector dense field and latitude dense field. More particularly, the dense field machine learning model applies neural network machine learning technology to classify each of the pixels as belonging to categories corresponding to classes of vertical vectors and latitude values. In some embodiments the dense field machine learning model comprises an encoder/decoder architecture comprising a feature encoder that inputs the input image, and VVF and LDF decoders to estimate the vertical vector and latitude values for each pixel. In other embodiments, the VVFs and LDFs instead are both estimated by a single decoder and/or using other machine learning model architectures.

As such, the method 600 at 614 includes generating a vertical vector dense field from the input image, the vertical vector dense field comprising a vertical vector of a projected vanishing point direction for a plurality of pixels of the input image. The method 600 also includes at 616 generating a latitude dense field from the input image, the latitude dense field comprising a projected latitude value for a plurality of pixels of the input image. In some embodiments, the dense field machine learning model generates the vertical vector and latitude value for each pixel in the form of a confidence vectors. For each pixel of the input image the dense field machine learning model generates a first confidence vector corresponding to a set of vertical vector bins, and a second confidence vector corresponding to a set of latitude value bins. Each of the vertical vector bins defines a class or category for a range of vertical vector angles values, and each of the latitude value bins defines a class or category for a range of latitude values. The value of each element of the confidence vectors indicates the probability that the predicted vertical vector and latitude values fall within the range of the corresponding bin. In some embodiments, the method 600 then proceeds to 618 with generating at least one modification to a first image based on the vertical vector dense field and the latitude dense field, to produce an output comprising a second image. For example, the input image 210 is modified by the image processing application to produce the processed image output 250 based on the view calibration parameters 242 generated by the dense field machine learning model 230. In some embodiments, the view calibration parameters 242 is structured as one or more dense field maps that correlated elements of the VVF and LDF to pixels of the input image. Those one or more dense field maps are optionally utilized in some embodiments to compute camera parameters associated with the input image, and/or other perform other imaging functions.

The VVF and LDF view calibration parameters estimated by the dense field machine learning model comprise information about the view and perspective of the input image that can be used for various purposes. For example, in some embodiments, the view calibration parameters can be used to obtain the traditional camera calibration parameters for an input image. Those traditional camera calibration parameters can be use, for example, for projecting a virtual image into the input image to create a composite image that has consistent view and perspective characteristics. As another example, camera calibration parameters derived from the VVF and LDF view calibration parameters, in some embodiments, are used for architectural rectification (for example, to adjust a view of building to make it look upright), image splicing, or special visual effects such as applying rain or snow effects to an image (so that the rain or snow appears to fall from the sky in the direction gravity would dictate, for example), or any other special visual effects that rely on accurate camera parameters to accurately produce an effect. However, unlike camera calibration parameters obtained from traditional techniques, camera calibration parameters derived from the VVF and LDF view calibration parameters can be estimated for input images obtained from uncontrolled sources that may have been cropped, rotated, warped or otherwise manipulated in an unknown manner prior to being received. With the embodiments described herein, various image enhancements can therefore be applied to images from uncontrolled sources while accurately taking into account view and perspective considerations.

In other implementations, the VVF and LDF view calibration parameters are utilized without first converting them into camera calibration parameters. For example, in some embodiments, VVF and LDF view calibration parameters are obtained for a first image and also for a second image into which the first image is to be pasted. Once the two sets of VVF and LDF view calibration parameters are obtained, the VVF and LDF of the first image are aligned with the VVF and LDF of the second image so that the resulting composite looks realistic. As another example, in some embodiments, image effects that leverage gravity predictions directly utilize VVF and LDF view calibration parameters to align the effects with a gravity field that inversely matches a VVF. As still another example, in some embodiments, VVF and LDF view calibration parameters are applied to image analysis applications, for example to evaluate whether an image is off-center cropped. A system then uses that information to alert the user that the image is off-center cropped, to recommend that the user attempt to apply reverse cropping filters to re-center the image, and/or provide the user with other alerts regarding the quality of the image.

In still other implementations, the VVF and LDF are used to define metrics to measure differences between the perspective fields of two scenes. Such metrics may serve as an optimization term for downstream applications like object placement; or as a criterion for recommendation and ranking. For example, at the pixel level, one simple metric is the sum of the difference between the vertical-vectors and the latitude values of the VVF and LDF for images of the two scenes. Given that both the vertical-vector and the latitude are in an angular space, a weighted sum of their angular differences provides for an Aggregate Perspective Field Discrepancy (APFD) metric, $$\varepsilon_{APFD}=(1-\alpha)\operatorname{arc\,cos}(u_1 \cdot u_2)+\alpha\|l_1-l_2\|_1$$

where $u_i$ is the vertical-vector and $l_i$ is the latitude value. Another metric based on aggregation uses a latitude value to modulate a corresponding vertical-vector. The resulting Modulated Up vector Discrepancy (MUD) metric can be expressed as:

$$\varepsilon_{MUD}=\|u_1 \cos(l_1)-u_2 \cos(l_2)\|_2$$

The $\cos(l_i)$ expression modulates the vertical-vector $u_i$ so the MUD metric is more sensitive to the vertical-vector angle near the horizon, and less sensitive to noise in the vertical-vector near the vertical vanishing points. After computing MUD metric over all the relevant pixels, the mean or the median of the results defines a patch level metric. Metrics based on the dense fields as disclosed herein are more consistent with human perception in measuring perspective consistency than non-perspective dense field derived metrics.

Other use-case applications of the perspective dense fields for image compositing include guided object placement and perspective-aware image recommendation. In both use-case applications, a dense field machine learning model, as described above, is used to predict perspective dense fields, VVF and LDF, for background images and foreground object sprites.

Figure 6A:
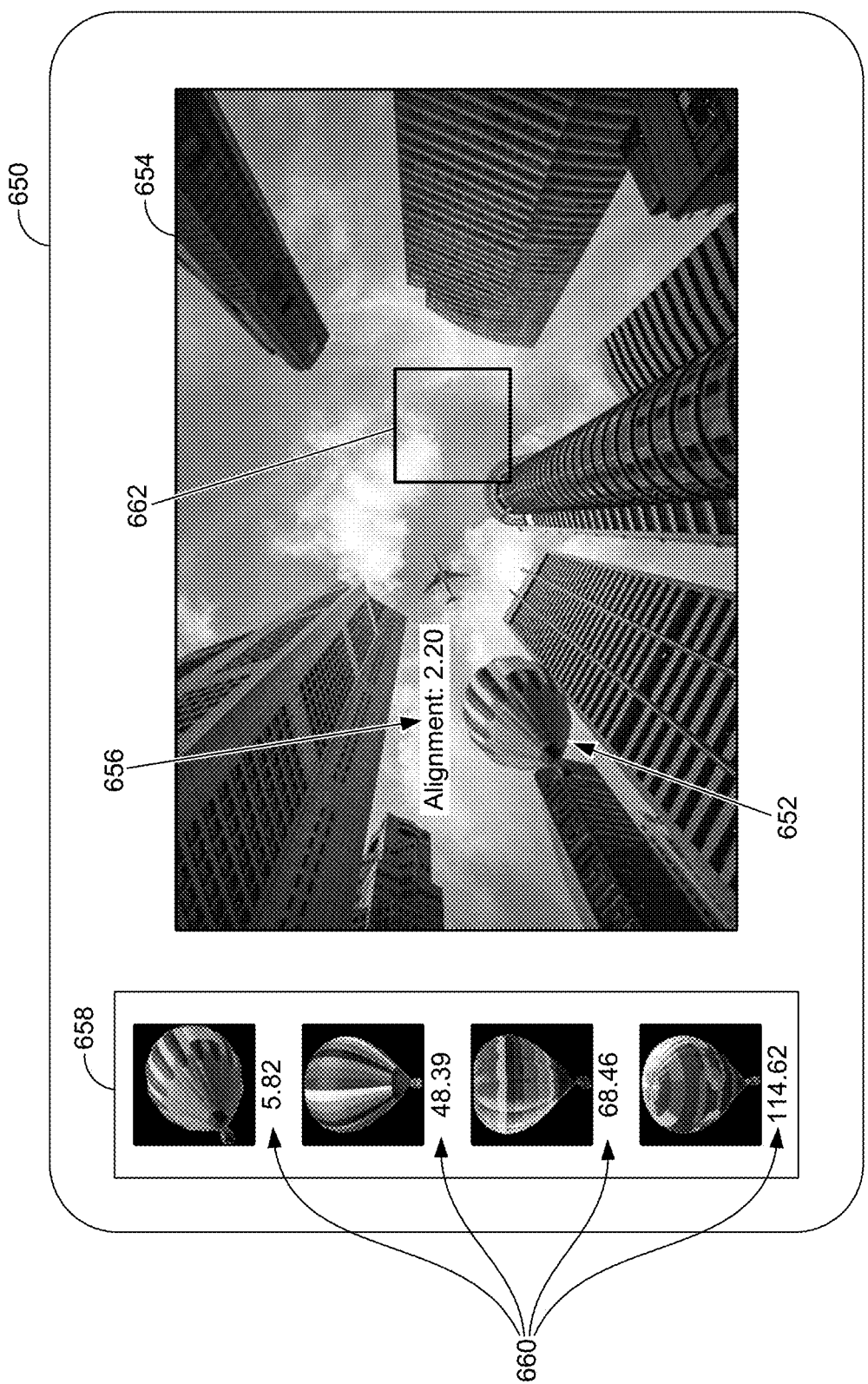
FIG. 6A is a diagram illustrating an example user interface for an application implementing embodiments in accordance with embodiments of the present disclosure.

With respect to guided object placement, during compositing task, foreground objects are often cropped and isolated and their original camera parameters are unknown. Instead of aligning camera parameters, in some embodiments, the image processing application calculates per-pixel error of the VVF and LDF perspective fields between the background and a foreground sprite to provide guidance for object placement. For example, with reference to FIG. 6A, an application interface 650 for the image processing application 220 is shown. When a user selects a foreground sprite 652 for placement on the background image 654, the dense filed machine learning model 230 predicts the VVF and LDF perspective dense field for both the selected foreground sprite 652 and background image 654, and the image processing application 220 suggests 2D operations (such as rotation, translation and flipping, for example) that would better align the VVF and LDF perspective dense fields of the foreground sprite 710 with the VVF and LDF perspective dense fields of the background image 654. In some embodiments, the image processing application 220 displays onto the application interface 650 an alignment metric (shown at 656) of the current perspective dense field alignment between the foreground sprite 652 and background image 654. For example, in some embodiments, the image processing application 220 may compute and display as the alignment metric 656 the MUD metric so that the user may perform operations to minimize alignment error as indicated by the MUD metric.

With respect to perspective-aware image recommendations, the image processing application 220, in some embodiments, retrieves images from a database of 2D images (such as from data store 106, for example) based on the perspective dense fields VVF and LDF of the current background image 654. For example, the user may select from a selection field 658 of the application interface 650 a type of foreground image (sprite) they wish to place on the background image 654, and the image processing application 220 will query the data store 106 for candidate images of the selected type, having perspective dense fields VVF and LDF at least approximately matching those of the background image 654. In some embodiments, the image processing application 220 can compute the alignment metric (e.g., MUD or APDF metric) for results of the query and present them to the user on the application interface 650 in a ranked order based on the alignment metric as shown at 660.

In another embodiment, a user selects a region of the background image 654 appearing on the application interface to define a bounding box 662 designating where a selected foreground image (sprite) is intended to be placed. The image processing application 220 uses estimates of the perspective dense fields for a plurality of candidate images with diverse view angles and computes a perspective field metric for each to retrieve the best image candidate (e.g., the image with the best metric) based on the bounding box specified by the user. The image processing application 220 then calculates the error (for example, from the APFD metric) between the background perspective dense fields and foreground image perspective dense fields and adjust the best image candidate with one or more 2D transformations to better align the best image's perspective fields with the background's perspective dense field within the bounding box 662. In some embodiments, the application interface 650 displays a ranking of different candidate images with corresponding errors from low to high as shown at 660.

With respect to machine language training, in some embodiments, cross entropy loss is used to train the dense field machine learning model 230 to recognize features for inferring and generating the VVF and LDF for an input raster image 211. For example, given an initial training image with known view calibration parameters, ground truth training images are randomly cropped from the initial training image (an optionally warped), and those ground truth training images applied to the dense field machine learning model 230 to compute a VVF and LDF for each ground truth training image. Because the view calibration parameters (VVF and LDF) for the training images are known, deviations from the known VVF and LDF and the VVF and LDF training predictions from the dense field machine learning model 230 are fed back to further train the dense field machine learning model 230. In some embodiments, training of the dense field machine learning model 230 is performed from images captured in cityscapes, or outdoor or indoor areas that include common objects that provide context to base predictions on. The dense field machine learning model 230, in some embodiments, is also trained to predict a VVF and LDF from different parts of an image that are descriptive of a known object. For example, the dense field machine learning model 230 can look at and recognize a utility pole and recognize that utility poles generally point up, without needing the context of a well-defined background. Similarly, the dense field machine learning model 230, in some embodiments, views an automobile and understands which way is up in that part of an input image with only minimal reference to a background. In this way, features in the form of recognizable objects or shapes also provide references used to train the dense field machine learning model 230 to predict the VVF and LDF. Moreover, training need not be limited to images of man-made cityscapes or urban areas. For example, in some implementations an initial training image used to generate ground truth training images is an image of a park or forest where features such as horizons, vanishing points of a path, the growth of vegetation in upward directions, for example, provide training cues for the dense field machine learning model 230.

Figure 7:
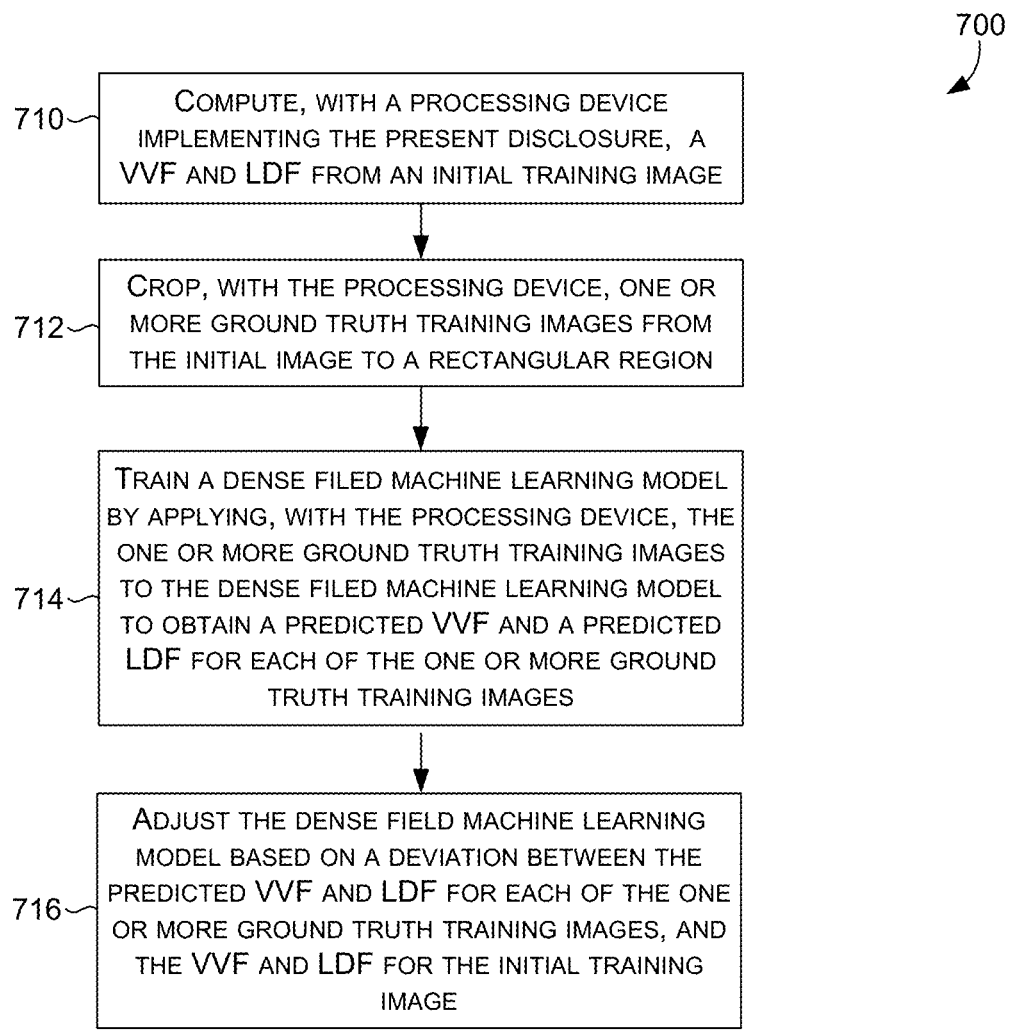
FIG. 7 is a flow chart illustrating an example method embodiment for training a dense field machine learning model in accordance with embodiments of the present disclosure.

FIG. 7 comprises a flow chart illustrating a method 700 embodiment for training a dense field machine learning model 230. It should be understood that the features and elements described herein with respect to the method 700 of FIG. 7 can be used in conjunction with, in combination with, or substituted for elements of, any of the other embodiments discussed herein and vice versa. Further, it should be understood that the functions, structures, and other descriptions of elements for embodiments described in FIG. 7 can apply to like or similarly named or described elements across any of the figures and/or embodiments described herein and vice versa. In some embodiments, elements of method 700 are implemented utilizing the image processing environment 200 disclosed above, or other processing device implementing the present disclosure.

The method 700 includes at 710 computing a VVF and LDF from an initial training image. In some embodiments, the initial training image is a controlled image, meaning that either it is an as-captured image, or that any editing performed on the image is known, so that the camera parameters of the initial training image can be readily determined. Because the camera parameters for the initial training image are known, the VVF and LDF view calibration parameters for the initial training image can be readily derived (for example, by a computing device 800) for use in creating ground truth training images. The method 700 at 712 includes cropping one or more ground truth training images from the initial image to a rectangular region, and at 714 includes training a dense field machine learning model by applying the one or more ground truth training images to the dense field machine learning model to obtain a predicted VVF and LDF for each of the one or more ground truth training images. At 716, the method 700 includes adjusting the dense field machine learning model based on a deviation between the predicted VVF and LDF for each of the one or more ground truth training images, and the VVF and LDF for the initial training image.

Figure 8:
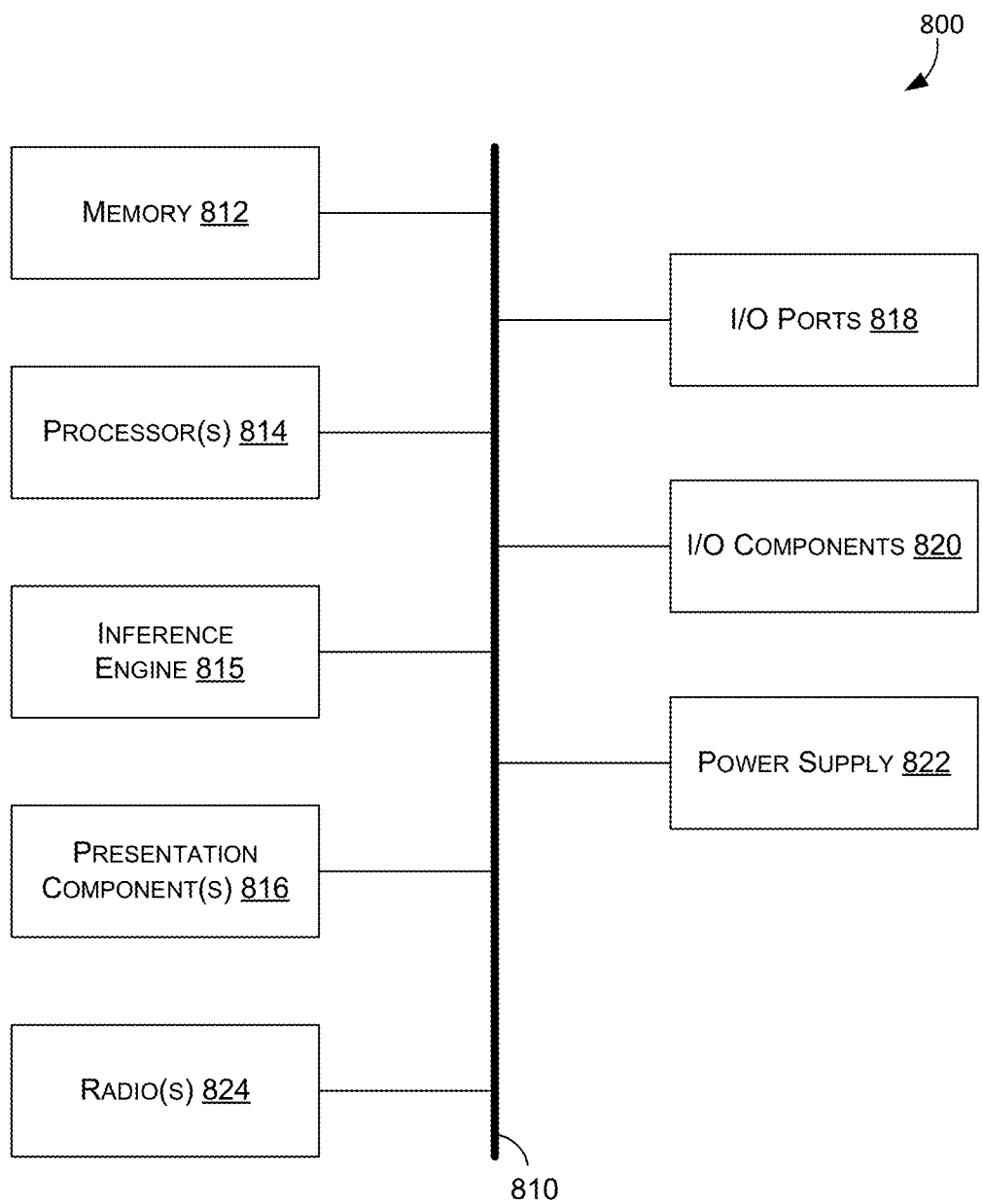
FIG. 8 is a diagram illustrating an example computing environment in accordance with embodiments of the present disclosure.

Referring to the drawings in general, and initially to FIG. 8 in particular, one exemplary operating environment for implementing aspects of the technology described herein is shown and designated generally as computing device 800. Computing device 800 is just one example of a suitable computing environment and is not intended to suggest any limitation as to the scope of use or functionality of the technology described herein. Neither should the computing device 800 be interpreted as having any dependency or requirement relating to any one or combination of components illustrated.

The technology described herein can be described in the general context of computer code or machine-usable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Aspects of the technology described herein can be practiced in a variety of system configurations, including handheld devices, consumer electronics, general-purpose computers, and specialty computing devices. Aspects of the technology described herein can also be practiced in distributed computing environments where tasks are performed by remote-processing devices that are linked through a communications network.

With continued reference to FIG. 8, computing device 800 includes a bus 810 that directly or indirectly couples the following devices: memory 812, one or more processors 814, a neural network inference engine 815, one or more presentation components 816, input/output (I/O) ports 818, I/O components 820, an illustrative power supply 822, and a radio(s) 824. Bus 810 represents one or more busses (such as an address bus, data bus, or combination thereof).

Although the various blocks of FIG. 8 are shown with lines for the sake of clarity, it should be understood that one or more of the functions of the components can be distributed between components. For example, a presentation component 816 such as a display device can also be considered an I/O component 820. The diagram of FIG. 8 is merely illustrative of an exemplary computing device that can be used in connection with one or more aspects of the technology described herein. Distinction is not made between such categories as "workstation," "server," "laptop," "tablet," "smart phone" or "handheld device," as all are contemplated within the scope of FIG. 8 and refer to "computer" or "computing device."

Memory 812 includes non-transient computer storage media in the form of volatile and/or nonvolatile memory. The memory 812 can be removable, non-removable, or a combination thereof. Exemplary memory includes solid-state memory, hard drives, and optical-disc drives. Computing device 800 includes one or more processors 814 that read data from various entities such as bus 810, memory 812, or I/O components 820. Presentation component(s) 816 present data indications to a user or other device. Neural network inference engine 815 comprises a neural network coprocessor, such as but not limited to a graphics processing unit (GPU), configured to execute a deep neural network (DNN) and/or machine learning models. In some embodiments, the dense field machine learning model 230 is implemented by the neural network inference engine 815. Exemplary presentation components 816 include a display device, speaker, printing component, and vibrating component. I/O port(s) 818 allow computing device 800 to be logically coupled to other devices including I/O components 820, some of which can be built in.

Illustrative I/O components include a microphone, joystick, game pad, satellite dish, scanner, printer, display device, wireless device, a controller (such as a keyboard, and a mouse), a natural user interface (NUI) (such as touch interaction, pen (or stylus) gesture, and gaze detection), and the like. In aspects, a pen digitizer (not shown) and accompanying input instrument (also not shown but which can include, by way of example only, a pen or a stylus) are provided in order to digitally capture freehand user input. The connection between the pen digitizer and processor(s) 814 can be direct or via a coupling utilizing a serial port, parallel port, and/or other interface and/or system bus known in the art. Furthermore, the digitizer input component can be a component separated from an output component such as a display device, or in some aspects, the usable input area of a digitizer can be coextensive with the display area of a display device, integrated with the display device, or can exist as a separate device overlaying or otherwise appended to a display device. Any and all such variations, and any combination thereof, are contemplated to be within the scope of aspects of the technology described herein.

A NUI processes air gestures, voice, or other physiological inputs generated by a user. Appropriate NUI inputs can be interpreted as ink strokes for presentation in association with the computing device 800. These requests can be transmitted to the appropriate network element for further processing. A NUI implements any combination of speech recognition, touch and stylus recognition, facial recognition, biometric recognition, gesture recognition both on screen and adjacent to the screen, air gestures, head and eye tracking, and touch recognition associated with displays on the computing device 800. The computing device 800, in some embodiments, is be equipped with depth cameras, such as stereoscopic camera systems, infrared camera systems, RGB camera systems, and combinations of these, for gesture detection and recognition. Additionally, the computing device 800, in some embodiments, is equipped with accelerometers or gyroscopes that enable detection of motion. The output of the accelerometers or gyroscopes can be provided to the display of the computing device 800 to render immersive augmented reality or virtual reality. A computing device, in some embodiments, includes radio(s) 824. The radio 824 transmits and receives radio communications. The computing device can be a wireless terminal adapted to receive communications and media over various wireless networks.

Figure 9:
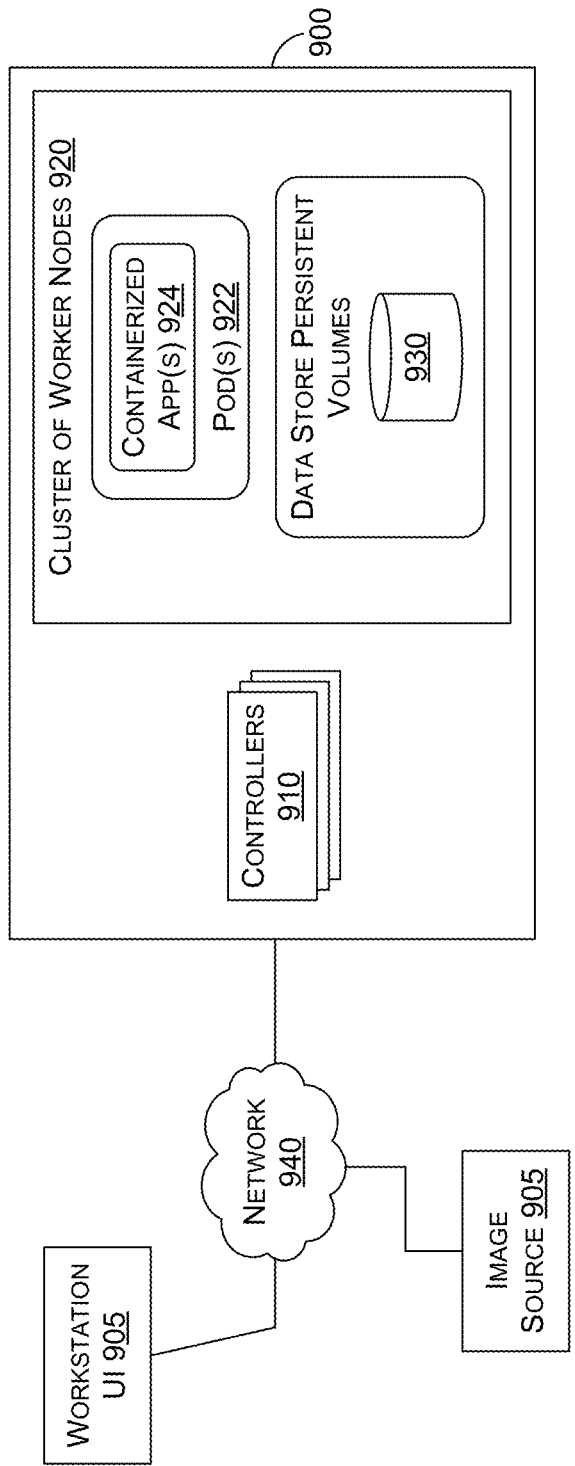
FIG. 9 is a diagram illustrating an example cloud based computing environment in accordance with embodiments of the present disclosure.

FIG. 9 is a diagram illustrating a cloud based computing environment 900 for implementing one or more aspects of the image processing environment 200 discussed with respect to any of the embodiments discussed herein. Cloud based computing environment 900 comprises one or more controllers 910 that each comprises one or more processors and memory, each programmed to execute code to implement at least part of the image processing environment 200. In one embodiment, the one or more controllers 910 comprise server components of a data center. The controllers 910 are configured to establish a cloud base computing platform executing one or more virtualized micro services for the image processing environment 200. For example, in one embodiment the image processing application 220 and/or the dense field machine learning model 230 are virtualized network services running on a cluster of worker nodes 920 established on the controllers 910. For example, the cluster of worker nodes 920 can include one or more of Kubernetes (K8s) pods 922 orchestrated onto the worker nodes 920 to realize one or more containerized applications 924 for the image processing environment 200. In some embodiments, the image source 205 can be coupled to the controllers 910 of the image processing environment 200 by a network 940 (for example, a public network such as the Internet, a proprietary network, or a combination thereof). In some embodiments the image source 205 instead comprises one or more data store persistent volumes 930. In other embodiments, a workstation user interface 905 is coupled by the network 940 to the controllers 910. In such an embodiment, a user at the workstation user interface 905 can upload the input image 210 or input raster image 211 to the controllers 910 that execute the image processing environment 200.

In various alternative embodiments, system and/or device elements, method steps, or example implementations described throughout this disclosure (such as the image processing application dense field module, dense field machine learning model, feature encoder, VVF decoder, LDF decoder, vertical vector bins, latitude value bins, image converter, optimizer, or any of the sub-parts of any thereof, for example) can be implemented at least in part using one or more computer systems, field programmable gate arrays (FPGAs), application specific integrated circuits (ASICs) or similar devices comprising a processor coupled to a memory and executing code to realize that elements, processes, or examples, said code stored on a non-transient hardware data storage device. Therefore, other embodiments of the present disclosure can include elements comprising program instructions resident on computer readable media which when implemented by such computer systems, enable them to implement the embodiments described herein. As used herein, the terms "computer readable media" and "computer storage media" refer to tangible memory storage devices having non-transient physical forms and includes both volatile and nonvolatile, removable and non-removable media. Such non-transient physical forms can include computer memory devices, such as but not limited to: punch cards, magnetic disk or tape, or other magnetic storage devices, any optical data storage system, flash read only memory (ROM), non-volatile ROM, programmable ROM (PROM), erasable-programmable ROM (E-PROM), Electrically erasable programmable ROM (EEPROM), random access memory (RAM), CD-ROM, digital versatile disks (DVD), or any other form of permanent, semi-permanent, or temporary memory storage system of device having a physical, tangible form. By way of example, and not limitation, computer-readable media can comprise computer storage media and communication media. Computer storage media does not comprise a propagated data signal. Program instructions include, but are not limited to, computer executable instructions executed by computer system processors and hardware description languages such as Very High Speed Integrated Circuit (VHSIC) Hardware Description Language (VHDL).

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and can be employed without reference to other features and sub-combinations and are contemplated within the scope of the claims.

In the preceding detailed description, reference is made to the accompanying drawings which form a part hereof wherein like numerals designate like parts throughout, and in which is shown, by way of illustration, embodiments that can be practiced. It is to be understood that other embodiments can be utilized and structural or logical changes can be made without departing from the scope of the present disclosure. Therefore, the preceding detailed description is not to be taken in the limiting sense, and the scope of embodiments is defined by the appended claims and their equivalents.

What is claimed is:

1. A method comprising:
generating, with a dense field machine learning model, a vertical vector dense field from an input image, the vertical vector dense field comprising a vertical vector of a projected vanishing point direction for a plurality of pixels of the input image;
generating, with the dense field machine learning model, a latitude dense field from the input image, the latitude dense field comprising a projected latitude value for the plurality of pixels of the input image; and
generating, with an image processing application, at least one modification to a first image based on the vertical vector dense field and the latitude dense field, to produce an output comprising a second image.

2. The method of claim 1, further comprising:
computing, with the image processing application, one or more camera parameters from the vertical vector dense field and the latitude dense field.

3. The method of claim 1, further comprising:
computing, with the image processing application, one or more camera parameters from the vertical vector dense field and the latitude dense field by optimizing for a set of camera parameters that predict a dense field view represented by the vertical vector dense field and the latitude dense field.

4. The method of claim 1, further comprising:
for each of the plurality of pixels of the input image, generating, with the dense field machine learning model, a first confidence vector corresponding to a set of vertical vector bins; and
for each of the plurality of pixels of the input image, generating, with the dense field machine learning model, a second confidence vector corresponding to a set of latitude value bins.

5. The method of claim 1, further comprising:
generating, with the dense field machine learning model, at least one dense field map for the input image comprising the vertical vector dense field and the latitude dense field.

6. The method of claim 1, wherein the projected latitude value comprises a world spherical coordinate system latitude value.

7. The method of claim 1, further comprising:
converting, with an image converter, the input image from a non-raster image to a raster image.

8. The method of claim 1, wherein the dense field machine learning model comprises an encoder-decoder machine learning neural network that includes a feature encoder, a vertical vector dense field decoder, and a latitude dense field decoder.

9. The method of claim 1, wherein the vertical vector dense field and the latitude dense field indicate a confidence for each vertical vector and each projected latitude value computed by the dense field machine learning model.

10. An image processing environment comprising:
a dense field machine learning model configured to receive an input image, wherein the dense field machine learning model is trained to:
generate a vertical vector dense field from the input image, the vertical vector dense field comprising a vertical vector of a projected vanishing point direction for a plurality of pixels of the input image; and
generate a latitude dense field from the input image, the latitude dense field comprising a projected latitude value for the plurality of pixels of the input image.

11. The image processing environment of claim 10, further comprising:
an image processing application executed by at least one controller; and
wherein the image processing application is configured to receive a first image from an image source and provide a raster version of the first image to the dense field machine learning model as the input image.

12. The image processing environment of claim 10, further comprising:
an image processing application executed by at least one controller, wherein the image processing application comprises an optimizer; and
wherein the optimizer is programmed to receive the vertical vector dense field and the latitude dense field from the dense field machine learning model and compute one or more camera parameters from the vertical vector dense field and the latitude dense field.

13. The image processing environment of claim 10, wherein the dense field machine learning model produces at least one dense field map for the input image comprising the vertical vector dense field and the latitude dense field.

14. The image processing environment of claim 13, further comprising:

an image processing application executed by at least one controller, wherein the image processing application generates at least one modification to a first image based on the vertical vector dense field and the latitude dense field, to produce an output comprising a second image.

15. The image processing environment of claim 10, wherein the dense field machine learning model comprises an encoder-decoder machine learning neural network that includes a feature encoder, a vertical vector dense field decoder, and a latitude dense field decoder.

16. The image processing environment of claim 10, wherein for each of the plurality of pixels of the input image, the dense field machine learning model generates a first confidence vector for each vertical vector of the vertical vector dense field, and a second confidence vector for each projected latitude value of the latitude dense field.

17. A non-transitory computer-readable medium storing executable instructions, which when executed by a processing device, cause the processing device to perform operations comprising:
    causing a dense field machine learning model to produce at least one dense field map for an input image, the at least one dense field map comprising a vertical vector dense field and a latitude dense field; and
    applying at least one imaging function to a first input image based on the at least one dense field map to produce a second image comprising a processed image.

18. The non-transitory computer-readable medium of claim 17, the operations further comprising:
    computing one or more camera parameters from the vertical vector dense field and the latitude dense field by optimizing for a set of camera parameters that predict the vertical vector dense field and the latitude dense field.

19. The non-transitory computer-readable medium of claim 17, wherein:
    the vertical vector dense field comprises a vertical vector of a projected up direction for a plurality of pixels of the input image; and
    the latitude dense field comprises a projected latitude value for the plurality of pixels of the input image.

20. The non-transitory computer-readable medium of claim 17, wherein the at least one dense field map indicates a confidence computed by the dense field machine learning model.

* * * * *